United States Patent
Wu et al.

(10) Patent No.: US 11,711,761 B2
(45) Date of Patent: Jul. 25, 2023

(54) TECHNIQUES FOR DELAY REDUCTION AND POWER OPTIMIZATION USING A SET OF ANTENNA MODULES

(71) Applicant: QUALCOMM Incorporated, San Diego, CA (US)

(72) Inventors: Yongle Wu, San Diego, CA (US); Raghu Narayan Challa, San Diego, CA (US); Mihir Vijay Laghate, San Diego, CA (US); Yong Li, San Diego, CA (US); Farhad Meshkati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 17/322,658

(22) Filed: May 17, 2021

(65) Prior Publication Data
US 2022/0369222 A1  Nov. 17, 2022

(51) Int. Cl.
| | |
|---|---|
| *H04W 48/20* | (2009.01) |
| *H04B 7/0404* | (2017.01) |
| *H04B 7/0408* | (2017.01) |
| *H04B 7/06* | (2006.01) |
| *H04B 17/318* | (2015.01) |
| *H04W 24/10* | (2009.01) |
| *H04W 76/16* | (2018.01) |
| *H04W 76/27* | (2018.01) |
| *H04B 7/08* | (2006.01) |

(Continued)

(52) U.S. Cl.
CPC .......... *H04W 48/20* (2013.01); *H04B 7/0404* (2013.01); *H04B 7/0408* (2013.01); *H04B 7/0695* (2013.01); *H04B 17/318* (2015.01); *H04W 24/10* (2013.01); *H04W 72/046* (2013.01); *H04W 72/542* (2023.01)

(58) Field of Classification Search
CPC ... H04W 48/20; H04W 24/10; H04W 72/046; H04W 72/085; H04B 7/0404; H04B 7/0408; H04B 7/0695; H04B 17/318
See application file for complete search history.

(56) References Cited

U.S. PATENT DOCUMENTS

| | | | | |
|---|---|---|---|---|
| 2013/0301454 A1* | 11/2013 | Seol | ...... | H04B 7/0695 370/252 |
| 2014/0307654 A1* | 10/2014 | Kim | ...... | H04L 5/0048 370/329 |

(Continued)

*Primary Examiner* — Harry H Kim
(74) *Attorney, Agent, or Firm* — Holland & Hart LLP

(57) ABSTRACT

Methods, systems, and devices for wireless communication at a user equipment (UE) are described. A UE may establish a wireless connection with a primary cell and may identify a set of antenna modules of the UE and multiple sets of receive beams. Each set of receive beams may include at least one beam from each antenna module. The UE may perform a measurement procedure on signals received from one or more candidate secondary cells using at least a first set of receive beams. The UE may then transmit, to the primary cell, a measurement report based on performing the measurement procedure upon determining that at least one of the multiple sets of receive beams satisfies a threshold value and before performing the measurement procedure on signals received from the one or more candidate secondary cells using at least one remaining set of receive beams.

30 Claims, 12 Drawing Sheets

(51) Int. Cl.
    *H04W 76/15*     (2018.01)
    *H04W 72/044*     (2023.01)
    *H04W 72/542*     (2023.01)

(56) References Cited

U.S. PATENT DOCUMENTS

| | | | |
|---|---|---|---|
| 2017/0207843 A1* | 7/2017 | Jung | H04W 74/006 |
| 2017/0257780 A1* | 9/2017 | Ryoo | H04B 7/0617 |
| 2019/0132109 A1* | 5/2019 | Zhou | H04W 74/0841 |
| 2019/0208478 A1* | 7/2019 | Park | H04W 76/27 |
| 2019/0281574 A1* | 9/2019 | Reial | G01S 5/10 |
| 2019/0320492 A1* | 10/2019 | Yang | H04W 76/28 |
| 2021/0007173 A1* | 1/2021 | Su | H04W 72/1268 |
| 2021/0037397 A1* | 2/2021 | Guo | H04W 72/046 |
| 2022/0070800 A1* | 3/2022 | Woo | H04B 7/0691 |
| 2022/0140878 A1* | 5/2022 | Zhu | H04B 7/088 370/252 |

* cited by examiner

TECHNIQUES FOR DELAY REDUCTION AND POWER OPTIMIZATION USING A SET OF ANTENNA MODULES

FIELD OF TECHNOLOGY

The present disclosure relates to wireless communication at a user equipment (UE), including techniques for delay reduction and power optimization using a set of antenna modules.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, wireless communications devices may utilize antenna arrays for communicating with other wireless communications devices. However, in some examples, techniques for communicating using antenna arrays may be improved.

SUMMARY

The described techniques relate to improved methods, systems, devices, and apparatuses that support techniques for delay reduction and power optimization using a set of antenna modules. Generally, the described techniques provide for One or more aspects of the present disclosure provide for a set of receive beams to be used by a user equipment (UE) to perform measurements to select and add a secondary cell while connected to a primary cell. A UE may establish a connection with a primary cell. The UE may include multiple antenna panels and may identify a set of receive beams that includes a receive beam from each antenna module. According to aspects depicted herein, the UE may identify one receive beam from each antenna panel as a set of receive beams for performing a measurement procedure. Accordingly, the UE may identify multiple sets of receive beams. In some examples, the UE may perform a measurement procedure and transmit, to the primary cell, a measurement report based on performing the measurement procedure upon determining that at least one of the multiple sets of receive beams satisfies a threshold value. The UE may transmit the measurement report before performing the measurement procedure on signals received from the one or more candidate secondary cells using at least one remaining set of receive beams of the multiple sets of receive beams.

A method for wireless communication at a UE is described. The method may include establishing a wireless connection with a primary cell, identifying a set of antenna modules of the UE and a set of multiple sets of receive beams, where each set of receive beams of the set of multiple sets of receive beams includes at least one beam from each antenna module of the set of antenna modules, performing a measurement procedure on signals received from one or more candidate secondary cells using at least a first set of receive beams of the set of multiple sets of receive beams, and transmitting, to the primary cell, a measurement report based on performing the measurement procedure upon determining that at least one of the set of multiple sets of receive beams satisfies a threshold value and before performing the measurement procedure on signals received from the one or more candidate secondary cells using at least one remaining set of receive beams of the set of multiple sets of receive beams.

An apparatus for wireless communication at a UE is described. The apparatus may include a processor, memory coupled with the processor, and instructions stored in the memory. The instructions may be executable by the processor to cause the apparatus to establish a wireless connection with a primary cell, identify a set of antenna modules of the UE and a set of multiple sets of receive beams, where each set of receive beams of the set of multiple sets of receive beams includes at least one beam from each antenna module of the set of antenna modules, perform a measurement procedure on signals received from one or more candidate secondary cells using at least a first set of receive beams of the set of multiple sets of receive beams, and transmit, to the primary cell, a measurement report based on performing the measurement procedure upon determining that at least one of the set of multiple sets of receive beams satisfies a threshold value and before performing the measurement procedure on signals received from the one or more candidate secondary cells using at least one remaining set of receive beams of the set of multiple sets of receive beams.

Another apparatus for wireless communication at a UE is described. The apparatus may include means for establishing a wireless connection with a primary cell, means for identifying a set of antenna modules of the UE and a set of multiple sets of receive beams, where each set of receive beams of the set of multiple sets of receive beams includes at least one beam from each antenna module of the set of antenna modules, means for performing a measurement procedure on signals received from one or more candidate secondary cells using at least a first set of receive beams of the set of multiple sets of receive beams, and means for transmitting, to the primary cell, a measurement report based on performing the measurement procedure upon determining that at least one of the set of multiple sets of receive beams satisfies a threshold value and before performing the measurement procedure on signals received from the one or more candidate secondary cells using at least one remaining set of receive beams of the set of multiple sets of receive beams.

A non-transitory computer-readable medium storing code for wireless communication at a UE is described. The code may include instructions executable by a processor to establish a wireless connection with a primary cell, identify a set of antenna modules of the UE and a set of multiple sets of receive beams, where each set of receive beams of the set of multiple sets of receive beams includes at least one beam from each antenna module of the set of antenna modules, perform a measurement procedure on signals received from one or more candidate secondary cells using at least a first set of receive beams of the set of multiple sets of receive beams, and transmit, to the primary cell, a measurement report based on performing the measurement procedure upon determining that at least one of the set of multiple sets of receive beams satisfies a threshold value and before performing the measurement procedure on signals received from the one or more candidate secondary cells using at least one remaining set of receive beams of the set of multiple sets of receive beams.

Some examples of the method, apparatuses, and non-transitory computer-readable medium described herein may further include operations, features, means, or instructions for performing the measurement procedure on signals received from the one or more candidate secondary cells using a second set of receive beams of the set of multiple sets of receive beams based on the first set of receive beams failing to satisfy the threshold value, where transmitting the measurement report includes transmitting the measurement report based on performing the measurement procedure on the signals received using the second set of receive beams.

Some examples of the method, apparatuses, and non-transitory computer-readable medium described herein may further include operations, features, means, or instructions for determining that a time difference between performing the measurement procedure on the signals received using the first set of receive beams and performing the measurement procedure on the signals received using the second set of receive beams satisfies a second threshold value and modifying, based on the time difference satisfying the second threshold value, a measurement database to include a result of the measurement procedure on the signals received using the first set of receive beams and a result of the measurement procedure on the signals received using the second set of receive beams.

Some examples of the method, apparatuses, and non-transitory computer-readable medium described herein may further include operations, features, means, or instructions for determining that a time difference between performing the measurement procedure on the signals received using the first set of receive beams and performing the measurement procedure on the signals received using the second set of receive beams fails to satisfy a second threshold value and modifying, based on the time difference failing to satisfy the second threshold value, a measurement database to replace a result of the measurement procedure on the signals received using the first set of receive beams with a result of the measurement procedure on the signals received using the second set of receive beams.

Some examples of the method, apparatuses, and non-transitory computer-readable medium described herein may further include operations, features, means, or instructions for identifying that the UE may be in a connected mode of operation, performing the measurement procedure on signals received using each set of receive beams of the set of multiple sets of receive beams based on identifying that the UE may be in the connected mode of operation, and performing a beam refinement procedure based on having performed the measurement procedure for each set of receive beams of the set of multiple sets of receive beams.

Some examples of the method, apparatuses, and non-transitory computer-readable medium described herein may further include operations, features, means, or instructions for determining that a measurement value of one or more parameters satisfies one or more second threshold values based on performing the measurement procedure on the signals received using the first set of receive beams and refraining from performing the measurement procedure on the at least one remaining set of receive beams based at least in part the measurement value satisfying the one or more second threshold values, where the measurement report may be based on performing the measurement procedure on the signals received using the first set of receive beams.

In some examples of the method, apparatuses, and non-transitory computer-readable medium described herein, determining that the measurement value of one or more parameters satisfies the one or more second threshold values may include operations, features, means, or instructions for determining that the measurement value of a signal to noise ratio, a reference signal receive quality, a reference signal receive power, or any combination thereof, may be greater than the one or more second threshold values.

In some examples of the method, apparatuses, and non-transitory computer-readable medium described herein, determining that the measurement value of one or more parameters satisfies the one or more second threshold values may include operations, features, means, or instructions for determining that the measurement value of a signal to noise ratio, a reference signal receive quality, a reference signal receive power, or any combination thereof, may be less than the one or more second threshold values.

Some examples of the method, apparatuses, and non-transitory computer-readable medium described herein may further include operations, features, means, or instructions for receiving, from the primary cell based on transmitting the measurement report, an indication of a secondary cell of the one or more candidate secondary cells with which the UE may be to establish a connection and establishing a connection with the indicated secondary cell in response to the received indication.

In some examples of the method, apparatuses, and non-transitory computer-readable medium described herein, the primary cell includes a cell associated with a first radio access technology of a non-standalone mode of operation, and the secondary cell includes a cell associated with a second radio access technology of the non-standalone mode of operation.

In some examples of the method, apparatuses, and non-transitory computer-readable medium described herein, the cell associated with the second radio access technology of the non-standalone mode of operation includes a primary secondary cell. In some examples of the method, apparatuses, and non-transitory computer-readable medium described herein, the primary cell includes a cell associated with a first radio frequency spectrum band, and the secondary cell includes a cell associated with a second radio frequency spectrum band.

DETAILED DESCRIPTION

Figure 1:
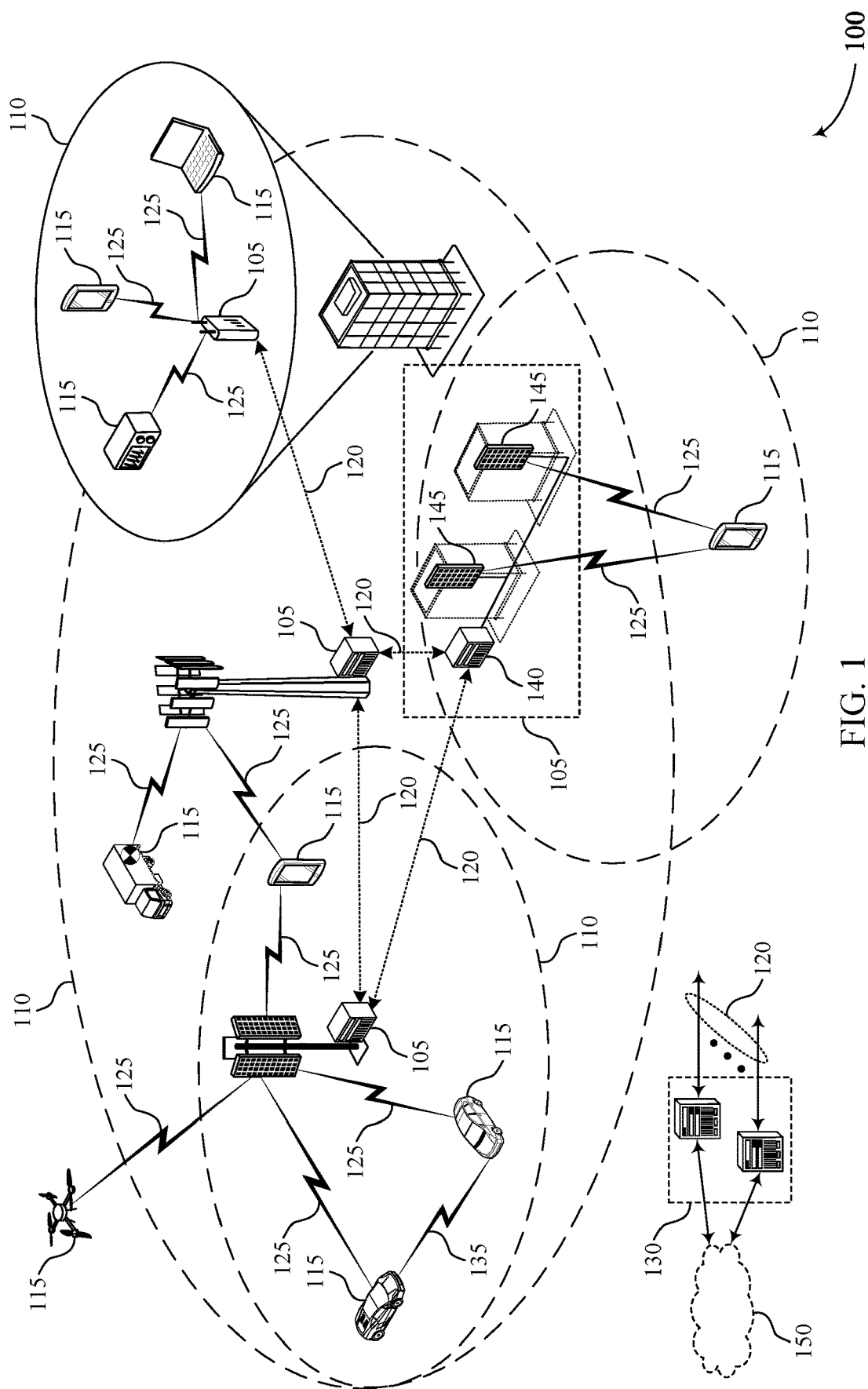
FIG. 1 illustrates an example of a wireless communications system that supports techniques for delay reduction and power optimization using a set of antenna modules in accordance with aspects of the present disclosure.

A user equipment (UE) may support connections with a primary cell and a secondary cell. In some aspects, a UE may anchor on or connect to a primary cell, while establishing a connection with a secondary cell. In some examples, a UE may support dual (e.g., non-standalone) architecture, where different radio access technologies can be use concurrently or simultaneously. For example, a non-standalone UE may anchor on or connect to a cell associated with a first radio access technology (e.g., Long-Term Evolution (LTE)), while facilitating communications with a cell associated with a second radio access technology (e.g., New Radio (NR)). In some cases, the cells associated with each radio access technology may be related to a single base station or may be related to separate base stations. Additionally or alternatively, the primary cell and the secondary cell may be related to separate base stations or the same base station. Broadly, the UE may be connected to two cells or two devices, such as base stations, (or nodes) at the same time.

In some wireless communications systems, a UE may have multiple antenna modules (e.g., oriented in different directions), each of which may have multiple antenna elements. The UE may use multiple receive beams for each antenna module that covers different angles of arrival. When searching for a candidate cell, the UE may perform measurements using each receive beam and select a secondary cell based on performing the measurements. Performing measurement procedure using each receive beam from multiple antenna modules may be a waste of time and power.

One or more aspects of the present disclosure provide for a set of receive beams to be used by a UE to perform measurements to select and add a secondary cell while connected to a primary cell. The set of receive beams includes a receive beam from each antenna module. For example, a UE may include four antenna modules (antenna module 1, antenna module 2, antenna module 3 and antenna module 4). In some examples, antenna module 1 may be associated with receive beams 1, 2, 3, and 4. Similarly, antenna module 2 may be associated with receive beams 5, 6, 7, and 8, the antenna module 3 may be associated with receive beams 9, 10, 11, and 12, and antenna module 4 may be associated with receive beams 13, 14, 15, and 16. According to aspects depicted herein, the UE may identify one receive beam from each antenna panel as a set of receive beams for performing a measurement procedure. For example, the UE may identify receive beams 1, 5, 9, and 13 as a first set, receive beams 2, 6, 10, and 14 as a second set, receive beams 3, 7, 11, and 15 as a third set, and receive beams 4, 8, 12, and 16 as a fourth set. The UE may then transmit, to the primary cell, a measurement report based on performing the measurement procedure upon determining that at least one of the multiple sets of receive beams satisfies a threshold value. The UE may transmit the measurement report before performing the measurement procedure on signals received from the one or more candidate secondary cells using at least one remaining set of receive beams of the multiple sets of receive beams.

Particular aspects of the subject matter described herein may be implemented to realize one or more advantages. The described techniques may support improvements in spatial diversity for supporting wireless communications by increasing coverage and reducing signaling overhead. Further, in some examples, the UE configuration as described herein may support higher data rates and diversity, thereby improving latency and reliability. As such, supported techniques may include improved network operations, and, in some examples, may promote network efficiencies, among other bene Aspects of the disclosure are initially described in the context of wireless communications systems. Aspects of the disclosure are further described in the context of process flows. Aspects of the disclosure are further illustrated by and described with reference to apparatus diagrams, system diagrams, and flowcharts that relate to techniques for delay reduction and power optimization using a set of antenna modules.

FIG. 1 illustrates an example of a wireless communications system 100 that supports techniques for delay reduction and power optimization using a set of antenna modules in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may establish a wireless connection with a primary cell. The UE 115 may identify a set of antenna modules of the UE and multiple sets of receive beams. In some examples, each set of receive beams of the multiple sets of receive beams may include at least one beam from each antenna module of the set of antenna modules. The UE 115 may perform a measurement procedure on signals received from one or more candidate secondary cells using at least a first set of receive beams of the multiple sets of receive beams. In some examples, the UE 115 may transmit, to the primary cell, a measurement report based on performing the measurement procedure upon determining that at least one of the plurality of sets of receive beams satisfies a threshold value and before performing the measurement procedure on signals received from the one or more candidate secondary cells using at least one remaining set of receive beams of the multiple sets of receive beams.

Figure 2:
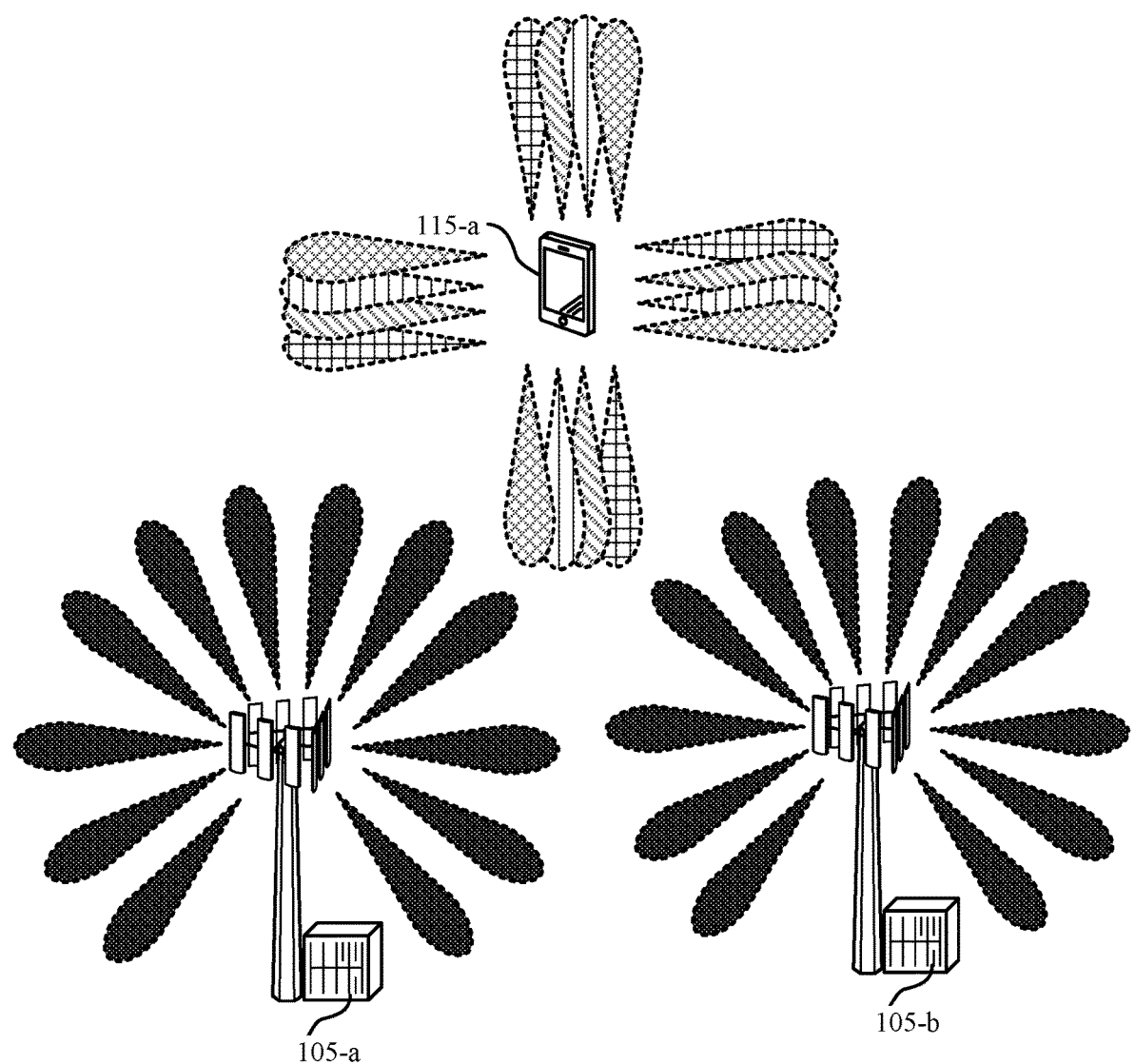
FIG. 2 illustrates an example of a wireless communications system that supports techniques for delay reduction and power optimization using a set of antenna modules in accordance with aspects of the present disclosure.

FIG. 2 illustrates an example of a wireless communications system 200 that supports techniques for delay reduction and power optimization using a set of antenna modules in accordance with aspects of the present disclosure. In some examples, the wireless communications system 200 may implement aspects of the wireless communications system 100. The wireless communications system 200 may include base stations 105-*a* and 105-*b*, and UE 115-*a*, which may be examples of base stations 105 and a UE 115 as described with reference to FIG. 1. Each base station 105 may serve a geographic coverage area. In some cases, one or more of the geographic coverage areas served by base stations 105-*a* and 105-*b* may overlap. In some cases, the UE 115-*a* may be configured to support improved communications by implementing techniques for delay reduction and power optimization. For example, the UE 115-*a* may use a reduced set of viable beams to perform a measurement procedure for identifying at least one secondary cell.

In the example of FIG. 2, the UE 115-*a* may support connectivity with a primary cell and a secondary cell. For instance, the UE 115-*a* may establish a wireless connection with a primary cell (associated with base station 105-*a*) and may determine a secondary cell (associated with base station 105-*b*) based on performing a measurement procedure. In some examples, the UE 115-*a* may operate in a non-standalone mode. That is, the UE 115-*a* may support a non-standalone architecture, where different radio access technologies may be utilized concurrently or simultaneously by different serving base stations. For example, a non-standalone UE may anchor on or connect to a first cell while facilitating communications with a second cell. Additionally or alternatively, a non-standalone UE may anchor on or connect to a cell associated with a first radio access technology (e.g., LTE), while facilitating communications with a cell associated with a second radio access technology (e.g., NR). In some cases, the cells associated with each radio access technology may be contained at a single base station or may be located on separate base stations. In some examples, a primary cell may include a cell associated with a first radio access technology of a non-standalone mode of operation, and the secondary cell may include a cell associated with a second radio access technology of the non-standalone mode of operation. Additionally or alternatively, the cell associated with the second radio access technology of the non-standalone mode of operation may include a primary secondary cell. In some examples, the primary cell may include a cell associated with a first radio frequency spectrum band (e.g., sub-6 GHz), and the secondary cell may include a cell associated with a second radio frequency spectrum band (e.g., above 6 GHz, or any radio frequency spectrum band higher or otherwise different than the first radio frequency spectrum band).

In some examples, the UE 115-*a* may be camped on a first cell. In some cases, the first cell may be supported by a different base station 105, or the first cell may be supported by the same base station 105, or any combination thereof. In some cases, the first cell may be associated with a radio access technology. In some cases, each network may be supported by a different base station 105, or each network may be supported by the same base station 105, or any combination thereof. In one example, the base station 105-*a* and 105-*b* may support a non-standalone 5G network. In some cases, a network may refer to a cell.

A UE 115-*a* may support communications with two base stations 105 at a time. In some examples, the UE 115-*a* may be configured to support dual-connectivity. In one example, the UE 115-*a* may communicate with base station 105-*a* associated with a first cell (e.g., a primary cell) associated with a radio access technology (e.g., a 5G network, an LTE network, or a 4G network) via a first communication link. For example, UE 115-*a* may establish a connection with the base station 105-*a* and a connection with the base station 105-*b* over a second communication link. Additionally or alternatively, as the UE 115-*a* is configured to support dual-connectivity, the UE 115-*a* may support communications with two base stations 105 (e.g., two networks) at a time.

The base station 105-*a* may perform a procedure (e.g., cell acquisition procedure, random access procedure, RRC connection procedure, RRC configuration procedure) with the UE 115-*a*. Each base station 105 (e.g., base station 105-*a* and base station 105-*b*) may be configured with multiple antennas, which may be used for directional or beamformed transmissions (e.g., beamformed communication beams 220). Similarly, the UE 115-*a* may be configured with multiple antennas, which may be used for directional or beamformed transmissions (e.g., beamformed communication beams 225). In some examples, the UE 115-*a* and the base stations 105-*a* and 105-*b* may participate in a beam sweep procedure. As illustrated, the base station 105-*a*, the base station 105-*b* and/or the UE 115-*a* may transmit a number of beamformed communication beams 220, 225 in different directions within a coverage area.

In some examples, the base station 105-*a*, the base station 105-*b* and/or the UE 115-*a* may repeat the beam sweep pattern over different communication beams 220 and communications beams 225 in an order which may be determined according to a given beam sweep pattern. The base station 105-*a*, the base station 105-*b* and/or the UE 115-*a* may have at least one active communication beam pair that is being used for wireless communications. The base station 105-*a* and/or base station 105-*b* may communicate with the UE 115-*a* on an active communication beam 220, and the UE 115-*a* may communicate with the base station 105-*a* and/or base station 105-*b* on an active communication beam 225. The active communication beam may be used for transmitting transmission such as data and control information. The active communication beam may be a downlink receive beam and an uplink transmit beam for the UE 115-*a*, or a downlink transmit beam and an uplink receive beam for the base station 105 (e.g., base station 105-*a* and/or base station 105-*b*).

In some wireless communications systems, a UE may have multiple antenna modules (e.g., oriented in different directions), which may also be referred to as antenna panels, each antenna module or antenna panel having multiple antenna elements. The UE may use multiple receive beams for each antenna module that covers different angles of arrival. When searching for a candidate cell (while connected to a primary cell), the UE may perform measurements using each receive beam (e.g., communications beams 225) and select a secondary cell based on performing the measurements. For example, if the UE had 4 antenna panels with 4 receive beams for each antenna panel, then the UE performs measurements using 16 receive beams prior to selecting a secondary cell. In other examples, the UE may have any number of antenna panels or receive beams for each antenna panel. In some examples, the antenna panels may have different numbers of antenna elements and/or different numbers of receive beams associated with the antenna panel. Additionally or alternatively, each antenna panel may be associated with 16 receive beams. In order to select a secondary cell, the UE may perform a measurement procedure using 64 beams, which may increase the power consumption at the UE. Additionally, performing measurements using every receive beam may introduce an increased delay in a primary secondary cell adding procedure (e.g., about 20 ms penalty with each additional beam). On the other hand, if UE is out of coverage, then utilizing all receive beams for the measurement procedure may be a waste of time and power. Thus, performing measurements using every receive beam may be inefficient for a UE and may be a waste of time and power.

Aspects of the present disclosure provide for the use of a viable set of receive beams. In particular, the present disclosure enables a tradeoff in a number of receive beams scanned (time and power) prior to reporting measurements to a network. For example, a UE may use a subset of receive beams while in good network coverage or when not in coverage. As depicted herein, a UE 115-*a* may use a subset of receive beams to perform measurements to select and add a secondary cell. The viable set of receive beams includes a receive beam (e.g., communications beam 225) from each antenna module. For example, antenna module 1 may be associated with communications beams 1, 2, 3, and 4. Similarly, antenna module 2 may be associated with communications beams 5, 6, 7, and 8, the antenna module 3 may be associated with communications beams 9, 10, 11, and 12, and antenna module 4 may be associated with communications beams 13, 14, 15, and 16.

As depicted in the example of FIG. 2, the UE 115-*a* may establish a wireless connection with a primary cell (associated with base station 105-*a*). The UE 115-*a* may then identify a set of antenna modules of the UE 115-*a* and multiple sets of receive beams (communications beam 225). Each set of receive beams of the multiple sets of receive beams may include at least one beam from each antenna module of the set of antenna modules. For example, the UE may identify one receive beam from each antenna panel as a viable set of receive beams (e.g., communications beams 1, 5, 9, and 13 as a first set, communications beams 2, 6, 10, and 14 as a second set, communications beams 3, 7, 11, and 15 as a third set, and communications beams 4, 8, 12, and 16 as a fourth set). In the example of FIG. 2, the first set 230 of communications beam 225, the second set 235 of communications beam 225, the third set 240 of communications beam 225, and the fourth set 245 of communications beam 225 may each include one communications beam 225 from each antenna module.

In some examples, the UE 115-*a* may then perform a measurement procedure on signals received from one or more candidate secondary cells on the first set 230 of communications beams 225 (with one receive beam from each antenna module). For example, the UE 115-*a* may perform a measurement procedure on signals received from one or more candidate secondary cells (via communications beam 220) using at least a first set 230 of receive beams (e.g., communications beam 225). If the UE 115-*a* determines that the measured parameters satisfy a threshold, then the UE 115-*a* may stop performing further measurements and report the measured parameters to the base station 105-*a* associated with the primary cell. For example, the UE 115-*a* may transmit, to the primary cell, a measurement report based on performing the measurement procedure upon determining that at least one of the multiple sets of receive beams satisfies a threshold value and before performing the measurement procedure on signals received from the one or more candidate secondary cells using at least one remaining set of receive beams of the multiple sets of receive beams.

In some examples, the UE 115-*a* may continue to perform the measurement procedure on signals received from the one or more candidate secondary cells using a second set of receive beams based on the first set of receive beams failing to satisfy the threshold value. For example, if the UE 115-*a* determines that the measurement procedure on the first set 230 of receive beams fails to satisfy the threshold, the UE 115-*a* may perform a measurement procedure on signals received from one or more candidate secondary cells (via communications beam 220) using a second set 235 of receive beams (e.g., communications beam 225). For example, the UE 115-*a* may determine that a measurement value of one or more parameters satisfies one or more second threshold values based on performing the measurement procedure on the signals received using the first set 230 of receive beams (e.g., communications beam 225). For example, the UE 115-*a* may determining that the measurement value of a signal to noise ratio, a reference signal receive quality, a reference signal receive power, or any combination thereof, is greater than or less than the one or more second threshold values.

Additionally or alternatively, the UE 115-*a* may refrain from performing the measurement procedure on the at least one remaining set of receive beams based on the measurement value satisfying the one or more second threshold values. That is, based on the measurement value satisfying a threshold, the UE 115-*a* may refrain from performing the measurement procedure on the second set 235 of receive beams (e.g., communications beam 225). In an example of a positive early exit, the UE 115-*a* may refrain from performing the measurement procedure on the at least one remaining set of receive beams based on determining that a signal to noise ratio is greater than 10 dB and reference signal receive power (with projected beamforming gain) greater than min(B1_threshold+5 dB, −80 dBm). In an example of a negative early exit, the UE 115-*a* may refrain from performing the measurement procedure on the at least one remaining set of receive beams based on determining that a peak reference signal receive power (with projected beamforming gain) is less than (B1-3 dB bias)) and a signal to noise ratio is less than −3 dB.

In some examples, the UE 115-*a* may determine whether to reset a measurement database based on an elapsed time between the two measurement rounds. For example, if the elapsed time between two measurement rounds is larger than 0.5 sec, then the UE 115-*a* may replace results from prior measurement rounds. The UE 115-*a* may determine that a time difference between performing the measurement procedure on the signals received using the first set 230 of receive beams and performing the measurement procedure on the signals received using the second set 235 of receive beams satisfies a second threshold value. The UE 115-*a* may modify, based on the time difference satisfying the second threshold value, a measurement database to include a result of the measurement procedure on the signals received using the first set 230 of receive beams and a result of the measurement procedure on the signals received using the second set 235 of receive beams. Additionally or alternatively, the UE 115-*a* may determine that a time difference between performing the measurement procedure on the signals received using the first set 230 of receive beams and performing the measurement procedure on the signals received using the second set 235 of receive beams fails to satisfy a second threshold value. In such cases, the UE 115-*a* may modify, based on the time difference failing to satisfy the second threshold value, a measurement database to replace a result of the measurement procedure on the signals received using the first set 230 of receive beams with a result of the measurement procedure on the signals received using the second set 235 of receive beams.

According to one or more aspects, the UE 115-*a* may measure all communications beams 225 (from the first set 230, the second set 235, the third set 240, and the fourth set 245) prior to starting a beam refinement process. When the UE 115-*a* is in a connected mode of operation, the UE 115-*a* may still search to find new cells or synchronization signal blocks. In such cases, the search can use the first set 230, the second set 235, the third set 240, and the fourth set 245 of beams. For instance, the UE 115-*a* may identify that the UE 115-*a* is in a connected mode of operation. The UE 115-*a* may perform the measurement procedure on signals received using each set of receive beams of the multiple sets of receive beams based on identifying that the UE 115-*a* is in the connected mode of operation. The UE 115-*a* may then perform a beam refinement procedure based on having performed the measurement procedure for each set of receive beams of the multiple sets of receive beams.

The aspects depicted herein may thus provide for a UE 115-*a* to be able to find the secondary cell without performing measurements using each receive beam before sending a measurement report to trigger the primary cell to add a secondary cell. The methods depicted herein may be performed in the context of an NR non-standalone mode for adding an NR cell when the UE is already connected to an LTE primary cell, or different radio frequency (RF) spectrum bands, for adding an NR cell in one frequency band (e.g., a higher frequency band) when the UE is already connected to an NR primary cell in another frequency band (e.g., a lower frequency band).

Figure 3:
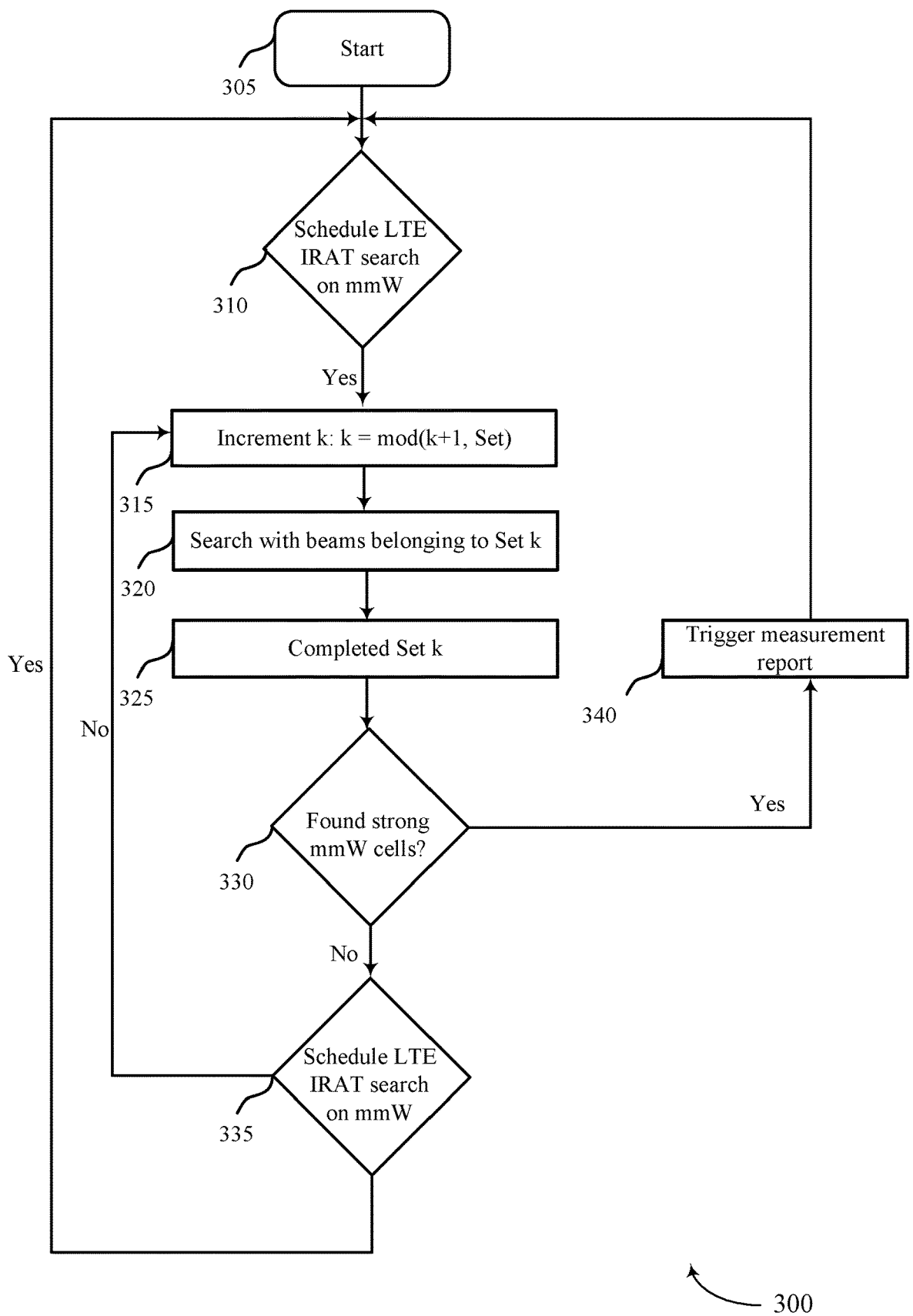
FIG. 3 illustrates an example of a process flow that supports techniques for delay reduction and power optimization using a set of antenna modules in accordance with aspects of the present disclosure.

FIG. 3 illustrates an example of a process flow 300 that supports techniques for delay reduction and power optimization using a set of antenna modules in accordance with aspects of the present disclosure. In some examples, the process flow 300 may implement or may be implemented by aspects of wireless communications system 100 as described in FIG. 1 and wireless communications system 200 as described in FIG. 2. The process flow 300 may illustrate an example of delay reduction and power optimization for improved communications.

Figure 4:
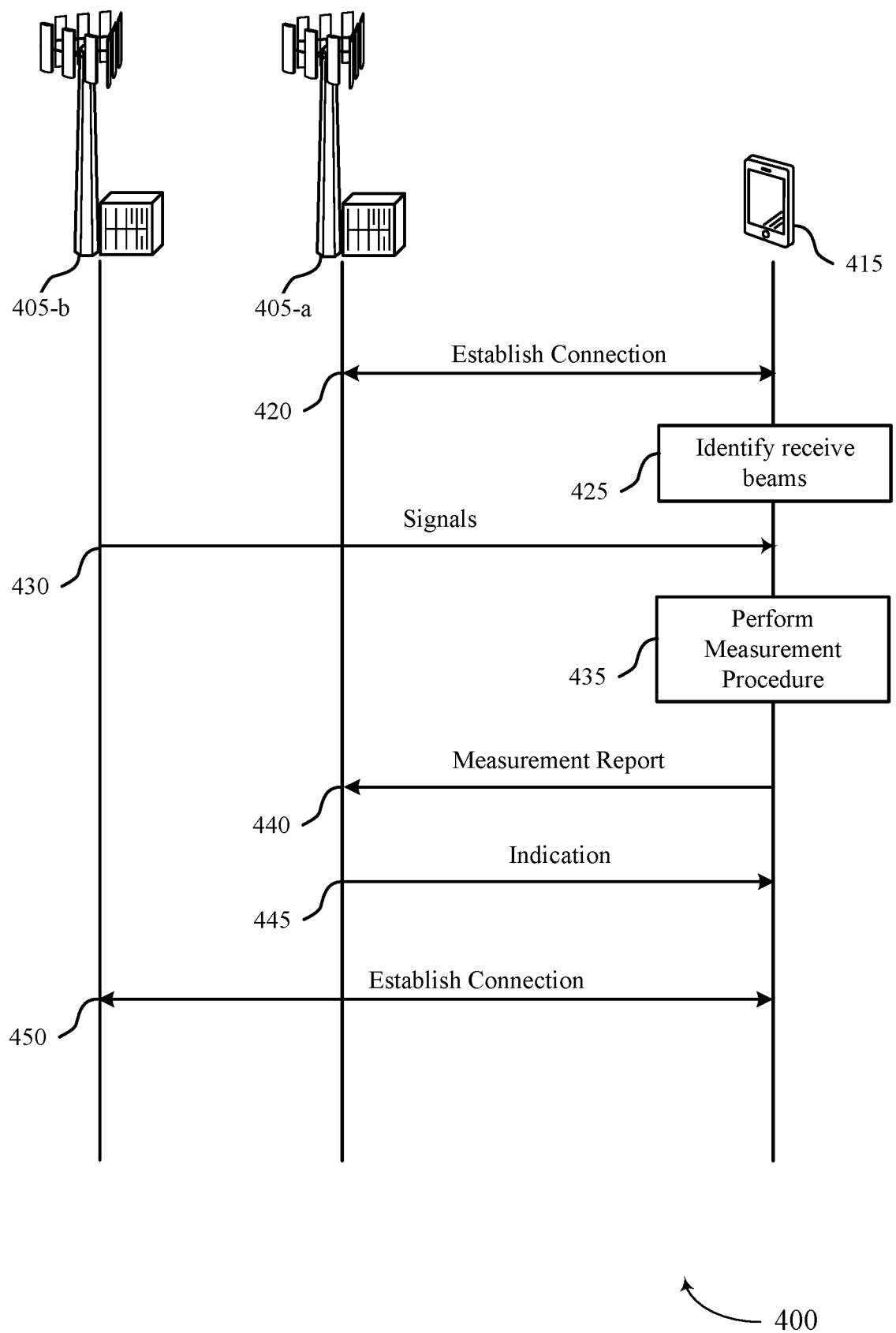
FIG. 4 illustrates an example of a process flow that supports techniques for delay reduction and power optimization using a set of antenna modules in accordance with aspects of the present disclosure.

For example, a UE, such as a UE described with reference to FIGS. 1 and 2, may support a connection with a primary cell. In some examples, the UE may support a non-standalone mode of communication. In some examples, the primary cell includes a cell associated with a first radio access technology of a non-standalone mode of operation, and the secondary cell includes a cell associated with a second radio access technology of the non-standalone mode of operation. In some examples, the cell associated with the second radio access technology of the non-standalone mode of operation may include a primary secondary cell. Additionally or alternatively, the primary cell may include a cell associated with a first radio frequency spectrum band, and the secondary cell may include a cell associated with a second radio frequency spectrum band. In some cases, the cells may each be served by a different base station, or multiple cells may be served by the same base station, where the one or more base stations may be examples of the corresponding wireless devices described with reference to FIG. 1 and FIG. 2. In the example of FIG. 4, the primary cell may be served by the base station 405-*a* and the secondary cell may be served by the base station 405-*b*. In some cases, a cell may refer to a network as described with reference to FIG. 2.

At 305, the process starts. At 310, a UE may be scheduled with an LTE inter radio access technology search on mmW. In some instances, a UE may perform rounds of connection establish attempts on a mmW carriers. In some examples, the UE may determine how often to schedule one round of search, At 315, if the UE is scheduled with an LTE inter radio access technology search on mmW, the UE may increment k and at 320 the UE may search using beams in set k. At 325, the UE may evaluate when the search with set k is completed. For example, the UE may perform a measurement procedure on signals received from one or more candidate secondary cells using at least a first set of receive beams (from set k) of multiple sets of receive beams.

At 330, the UE determines whether a strong mmW cell is found. If the UE determines that a strong cell found with respect to a report criterion. For example, the UE may determine that a measurement value of one or more parameters satisfies one or more threshold values based on performing the measurement procedure on the signals received using the first set of receive beams. The UE may then refrain from performing the measurement procedure on the at least one remaining set of receive beams based on the measurement value satisfying the one or more threshold values.

In some examples, the UE may determine that the measurement value of a signal to noise ratio, a reference signal receive quality, a reference signal receive power, or any combination thereof, is greater than the one or more threshold values. That is, the UE may determine that a strong mmW cell is found based on the one or more threshold values. Additionally or alternatively, the UE may determine that the measurement value of a signal to noise ratio, a reference signal receive quality, a reference signal receive power, or any combination thereof, is less than the one or more threshold values. The UE may determine to refrain from performing further measurements when no cell or weak cells are found.

If an exit is not triggered (when a strong mmW cell is not found or when no cell or weak cells are found), then at 335, the UE may schedule an LTE inter radio access technology search on mmW with set (k+1).

When an exit is triggered, at 340, the UE may trigger a measurement report. The UE may transmit, to the primary cell, a measurement report based on performing the measurement procedure upon determining that at least one of multiple sets of receive beams satisfies a threshold value and before performing the measurement procedure on signals received from the one or more candidate secondary cells using at least one remaining set of receive beams of multiple sets of receive beams.

FIG. 4 illustrates an example of a process flow 400 that supports techniques for delay reduction and power optimization using a set of antenna modules in accordance with aspects of the present disclosure. In some examples, the process flow 400 may implement or may be implemented by aspects of wireless communications system 100 as described in FIG. 1 and wireless communications system 200 as described in FIG. 2. The process flow 400 may illustrate an example of delay reduction and power optimization for improved communications.

For example, a UE 415, such as a UE described with reference to FIGS. 1 and 2, may support a connection with a primary cell. In some examples, the UE may support a non-standalone mode of communication. In one example, the UE may support a first connection with a primary cell and may look to establish a connection with a secondary cell. In some cases, the cells may each be served by a different base station, or multiple cells may be served by the same base station, where the one or more base stations may be examples of the corresponding wireless devices described with reference to FIG. 1 and FIG. 2. In the example of FIG. 4, the primary cell may be served by the base station 405-*a* and the secondary cell may be served by the base station 405-*b*. In some cases, a cell may refer to a network as described with reference to FIG. 2. In some cases, instead of a UE implementing procedures to improve communications, another device, such as a base station may implement the procedures.

In the following description of the process flow 400, the operations between the UE 415, the first base station 405-*a* (associated with a primary cell), and the second base station 405-*b* (associated with a secondary cell) may be transmitted in a different order than the example order shown, or the operations performed by the UE 415, the first base station 405-*a*, and the second base station 405-*b* may be performed in different orders or at different times. Some operations may also be omitted from the process flow 400, and other operations may be added to the process flow 400.

At 420, the UE 415 may establish a wireless connection with a primary cell served by the base station 405-*a*. At 425, the UE 415 may identify a set of antenna modules of the UE 415 and multiple sets of receive beams. In some examples, each set of receive beams of the multiple sets of receive beams may include at least one beam from each antenna module of the set of antenna modules.

At 430, the UE 415 may receive signals from a candidate secondary cell served by the base station 405-*b*. At 435, the UE 415 may perform a measurement procedure based on receiving the signals. For example, the UE 415 may perform the measurement procedure on the signals received from one or more candidate secondary cells using at least a first set of receive beams of the multiple sets of receive beams.

In some examples, the UE 415 may perform the measurement procedure on signals received from the one or more candidate secondary cells using a second set of receive beams of the multiple sets of receive beams based on the first set of receive beams failing to satisfy a threshold value.

At 440, the UE 415 may transmit, to the primary cell served by the base station 405-*a*, a measurement report based on performing the measurement procedure. The UE 415 may transmit the measurement report upon determining that at least one of the multiple sets of receive beams satisfies the threshold value and before performing the measurement procedure on signals received from the one or more candidate secondary cells using at least one remaining set of receive beams of the multiple sets of receive beams.

At 445, the UE 415 may receive, from the primary cell served by the base station 405-*a* and based on transmitting the measurement report, an indication of a secondary cell of the one or more candidate secondary cells with which the UE 415 is to establish a connection. For example, the UE 415 may receive an indication to establish a connection with the secondary cell served by the base station 405-*b*. At 450, the UE 415 may establish a connection with the indicated secondary cell in response to the received indication. For example, the UE 415 may establish a connection with the secondary cell served by the base station 405-*b* in response to receiving the indication at 445.

Figure 5:
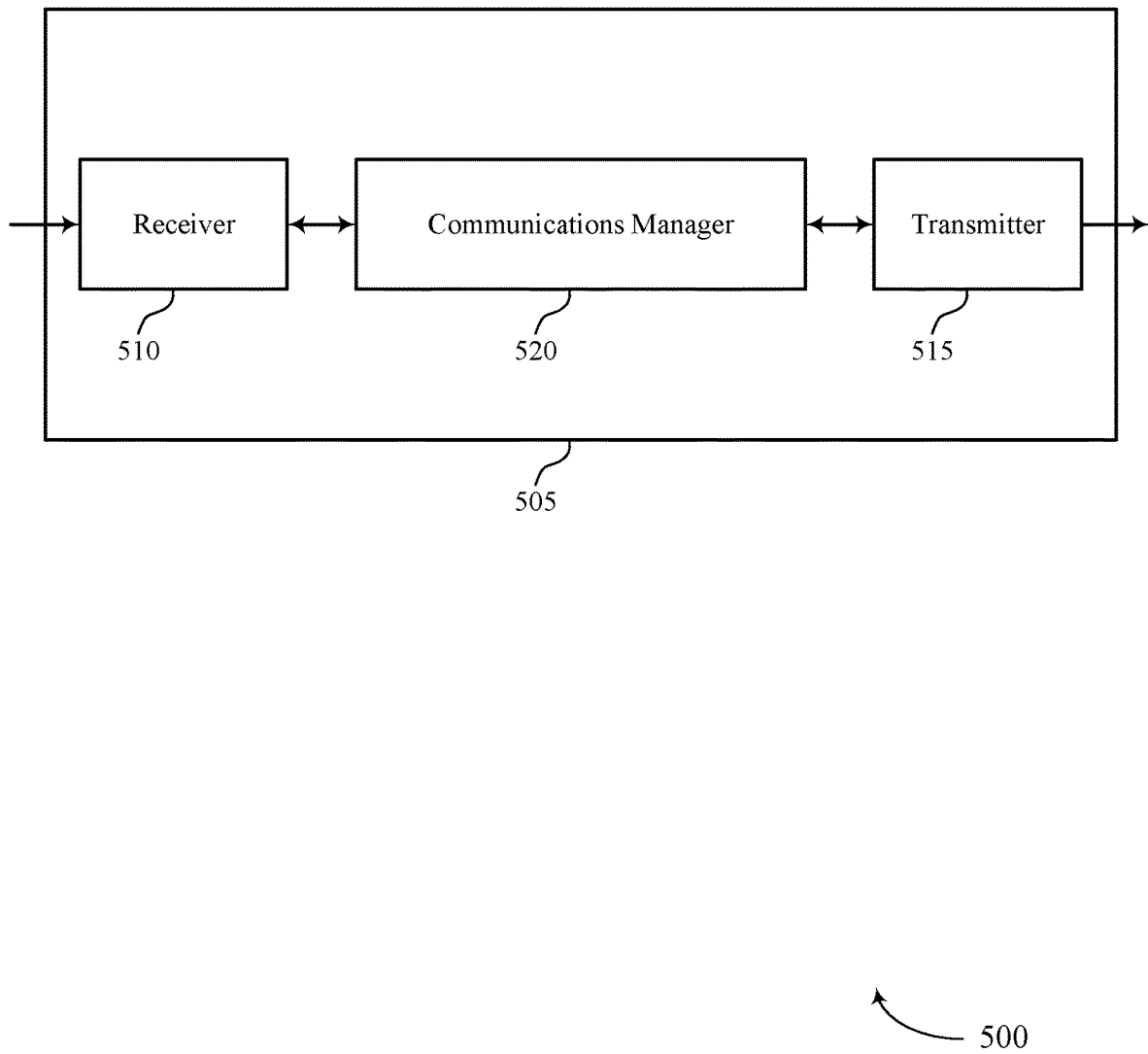
FIGS. 5 and 6 show block diagrams of devices that support techniques for delay reduction and power optimization using a set of antenna modules in accordance with aspects of the present disclosure.

FIG. 5 shows a block diagram 500 of a device 505 that supports techniques for delay reduction and power optimization using a set of antenna modules in accordance with aspects of the present disclosure. The device 505 may be an example of aspects of a UE 115 as described herein. The device 505 may include a receiver 510, a transmitter 515, and a communications manager 520. The device 505 may also include one or more processors, memory coupled with the one or more processors, and instructions stored in the memory that are executable by the one or more processors to enable the one or more processors to perform the techniques for delay reduction and power optimization using a set of antenna modules as discussed herein. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for delay reduction and power optimization using a set of antenna modules). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for delay reduction and power optimization using a set of antenna modules). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for delay reduction and power optimization using a set of antenna modules as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for establishing a wireless connection with a primary cell. The communications manager 520 may be configured as or otherwise support a means for identifying a set of antenna modules of the UE and a set of multiple sets of receive beams, where each set of receive beams of the set of multiple sets of receive beams includes at least one beam from each antenna module of the set of antenna modules. The communications manager 520 may be configured as or otherwise support a means for performing a measurement procedure on signals received from one or more candidate secondary cells using at least a first set of receive beams of the set of multiple sets of receive beams. The communications manager 520 may be configured as or otherwise support a means for transmitting, to the primary cell, a measurement report based on performing the measurement procedure upon determining that at least one of the set of multiple sets of receive beams satisfies a threshold value and before performing the measurement procedure on signals received from the one or more candidate secondary cells using at least one remaining set of receive beams of the set of multiple sets of receive beams.

By including or configuring the communications manager 520 in accordance with examples as described herein, the device 505 (e.g., a processor controlling or otherwise coupled to the receiver 510, the transmitter 515, the communications manager 520, or a combination thereof) may support techniques reduced processing, reduced power consumption, more efficient utilization of communication resources.

Figure 6:
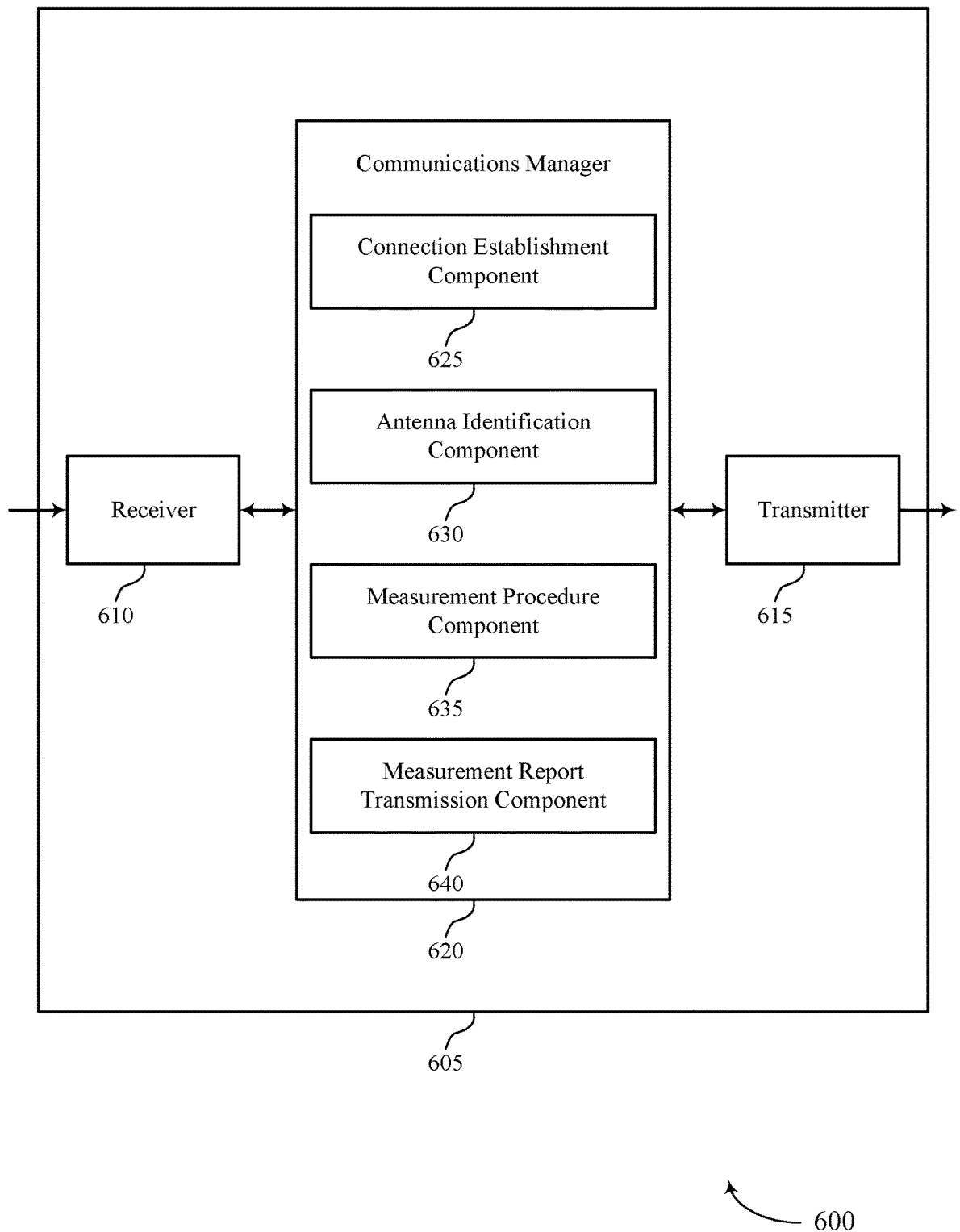

FIG. 6 shows a block diagram 600 of a device 605 that supports techniques for delay reduction and power optimization using a set of antenna modules in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for delay reduction and power optimization using a set of antenna modules). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for delay reduction and power optimization using a set of antenna modules). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for delay reduction and power optimization using a set of antenna modules as described herein. For example, the communications manager 620 may include a connection establishment component 625, an antenna identification component 630, a measurement procedure component 635, a measurement report transmission component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The connection establishment component 625 may be configured as or otherwise support a means for establishing a wireless connection with a primary cell. The antenna identification component 630 may be configured as or otherwise support a means for identifying a set of antenna modules of the UE and a set of multiple sets of receive beams, where each set of receive beams of the set of multiple sets of receive beams includes at least one beam from each antenna module of the set of antenna modules. The measurement procedure component 635 may be configured as or otherwise support a means for performing a measurement procedure on signals received from one or more candidate secondary cells using at least a first set of receive beams of the set of multiple sets of receive beams. The measurement report transmission component 640 may be configured as or otherwise support a means for transmitting, to the primary cell, a measurement report based on performing the measurement procedure upon determining that at least one of the set of multiple sets of receive beams satisfies a threshold value and before performing the measurement procedure on signals received from the one or more candidate secondary cells using at least one remaining set of receive beams of the set of multiple sets of receive beams.

In some cases, the connection establishment component 625, the antenna identification component 630, the measurement procedure component 635, and the measurement report transmission component 640 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the connection establishment component 625, the antenna identification component 630, the measurement procedure component 635, and the measurement report transmission component 640 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
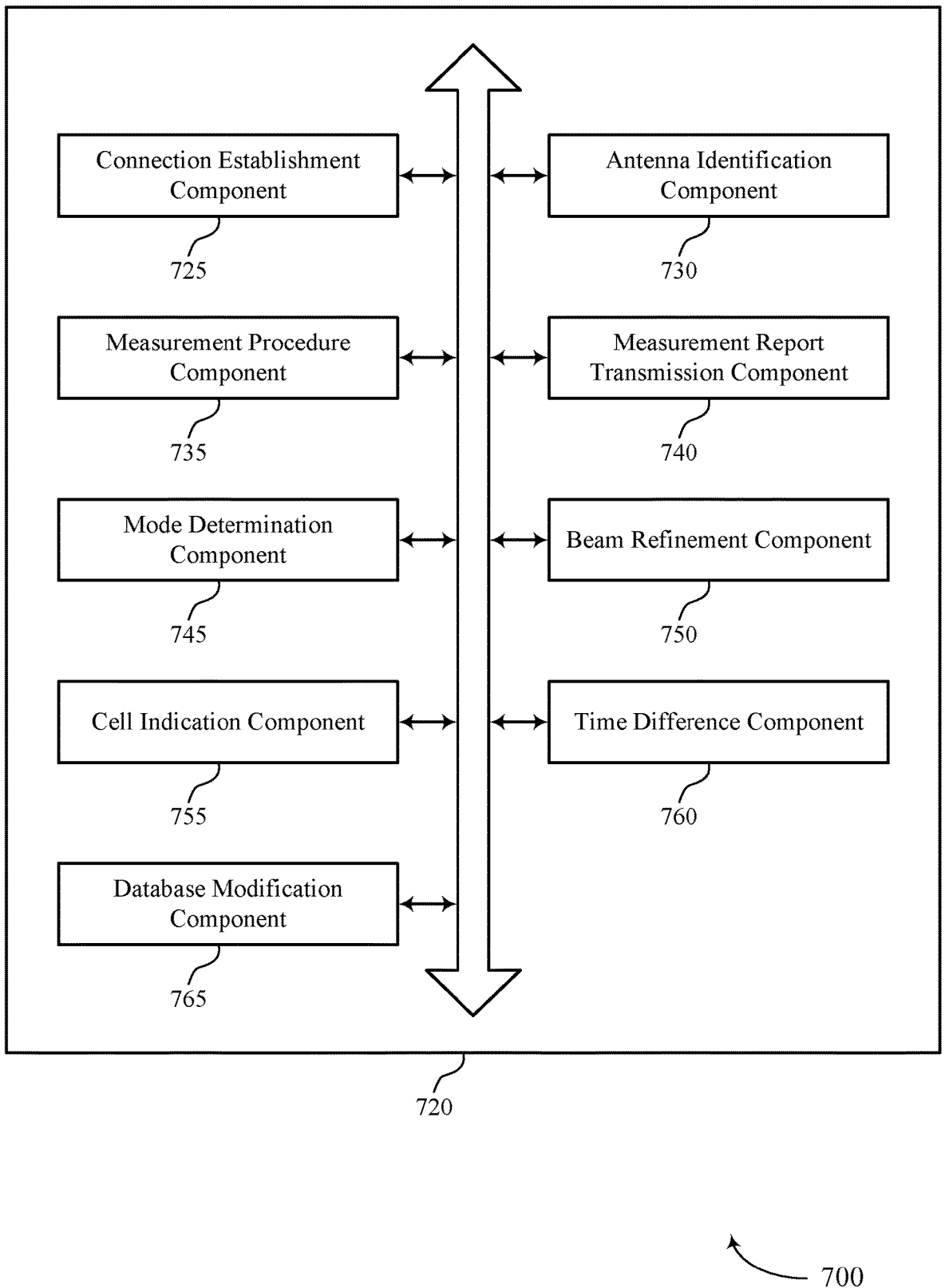
FIG. 7 shows a block diagram of a communications manager that supports techniques for delay reduction and power optimization using a set of antenna modules in accordance with aspects of the present disclosure.

FIG. 7 shows a block diagram 700 of a communications manager 720 that supports techniques for delay reduction and power optimization using a set of antenna modules in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for delay reduction and power optimization using a set of antenna modules as described herein. For example, the communications manager 720 may include a connection establishment component 725, an antenna identification component 730, a measurement procedure component 735, a measurement report transmission component 740, a mode determination component 745, a beam refinement component 750, a cell indication component 755, a time difference component 760, a database modification component 765, or any combination thereof. Each of these components may communicate, directly or indirectly, with one another (e.g., via one or more buses).

In some cases, the connection establishment component 725, the antenna identification component 730, the measurement procedure component 735, the measurement report transmission component 740, the mode determination component 745, the beam refinement component 750, the cell indication component 755, the time difference component 760, the database modification component 765 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the connection establishment component 725, the antenna identification component 730, the measurement procedure component 735, the measurement report transmission component 740, the mode determination component 745, the beam refinement component 750, the cell indication component 755, the time difference component 760, the database modification component 765 discussed herein.

The communications manager 720 may support wireless communication at a UE in accordance with examples as disclosed herein. The connection establishment component 725 may be configured as or otherwise support a means for establishing a wireless connection with a primary cell. The antenna identification component 730 may be configured as or otherwise support a means for identifying a set of antenna modules of the UE and a set of multiple sets of receive beams, where each set of receive beams of the set of multiple sets of receive beams includes at least one beam from each antenna module of the set of antenna modules. The measurement procedure component 735 may be configured as or otherwise support a means for performing a measurement procedure on signals received from one or more candidate secondary cells using at least a first set of receive beams of the set of multiple sets of receive beams. The measurement report transmission component 740 may be configured as or otherwise support a means for transmitting, to the primary cell, a measurement report based on performing the measurement procedure upon determining that at least one of the set of multiple sets of receive beams satisfies a threshold value and before performing the measurement procedure on signals received from the one or more candidate secondary cells using at least one remaining set of receive beams of the set of multiple sets of receive beams.

In some examples, the measurement procedure component 735 may be configured as or otherwise support a means for performing the measurement procedure on signals received from the one or more candidate secondary cells using a second set of receive beams of the set of multiple sets of receive beams based on the first set of receive beams failing to satisfy the threshold value, where transmitting the measurement report includes transmitting the measurement report based on performing the measurement procedure on the signals received using the second set of receive beams.

In some examples, the time difference component 760 may be configured as or otherwise support a means for determining that a time difference between performing the measurement procedure on the signals received using the first set of receive beams and performing the measurement procedure on the signals received using the second set of receive beams satisfies a second threshold value. In some examples, the database modification component 765 may be configured as or otherwise support a means for modifying, based on the time difference satisfying the second threshold value, a measurement database to include a result of the measurement procedure on the signals received using the first set of receive beams and a result of the measurement procedure on the signals received using the second set of receive beams.

In some examples, the time difference component 760 may be configured as or otherwise support a means for determining that a time difference between performing the measurement procedure on the signals received using the first set of receive beams and performing the measurement procedure on the signals received using the second set of receive beams fails to satisfy a second threshold value. In some examples, the database modification component 765 may be configured as or otherwise support a means for modifying, based on the time difference failing to satisfy the second threshold value, a measurement database to replace a result of the measurement procedure on the signals received using the first set of receive beams with a result of the measurement procedure on the signals received using the second set of receive beams.

In some examples, the mode determination component 745 may be configured as or otherwise support a means for identifying that the UE is in a connected mode of operation. In some examples, the measurement procedure component 735 may be configured as or otherwise support a means for performing the measurement procedure on signals received using each set of receive beams of the set of multiple sets of receive beams based on identifying that the UE is in the connected mode of operation. In some examples, the beam refinement component 750 may be configured as or otherwise support a means for performing a beam refinement procedure based on having performed the measurement procedure for each set of receive beams of the set of multiple sets of receive beams.

In some examples, the measurement procedure component 735 may be configured as or otherwise support a means for determining that a measurement value of one or more parameters satisfies one or more second threshold values based on performing the measurement procedure on the signals received using the first set of receive beams. In some examples, the measurement procedure component 735 may be configured as or otherwise support a means for refraining from performing the measurement procedure on the at least one remaining set of receive beams based on the measurement value satisfying the one or more second threshold values, where the measurement report is based on performing the measurement procedure on the signals received using the first set of receive beams.

In some examples, to support determining that the measurement value of one or more parameters satisfies the one or more second threshold values, the measurement procedure component 735 may be configured as or otherwise support a means for determining that the measurement value of a signal to noise ratio, a reference signal receive quality, a reference signal receive power, or any combination thereof, is greater than the one or more second threshold values.

In some examples, to support determining that the measurement value of one or more parameters satisfies the one or more second threshold values, the measurement procedure component 735 may be configured as or otherwise support a means for determining that the measurement value of a signal to noise ratio, a reference signal receive quality, a reference signal receive power, or any combination thereof, is less than the one or more second threshold values.

In some examples, the cell indication component 755 may be configured as or otherwise support a means for receiving, from the primary cell based on transmitting the measurement report, an indication of a secondary cell of the one or more candidate secondary cells with which the UE is to establish a connection. In some examples, the connection establishment component 725 may be configured as or otherwise support a means for establishing a connection with the indicated secondary cell in response to the received indication.

In some examples, the primary cell includes a cell associated with a first radio access technology of a non-standalone mode of operation, and the secondary cell includes a cell associated with a second radio access technology of the non-standalone mode of operation.

In some examples, the cell associated with the second radio access technology of the non-standalone mode of operation includes a primary secondary cell. In some examples, the primary cell includes a cell associated with a first radio frequency spectrum band, and the secondary cell includes a cell associated with a second radio frequency spectrum band.

Figure 8:
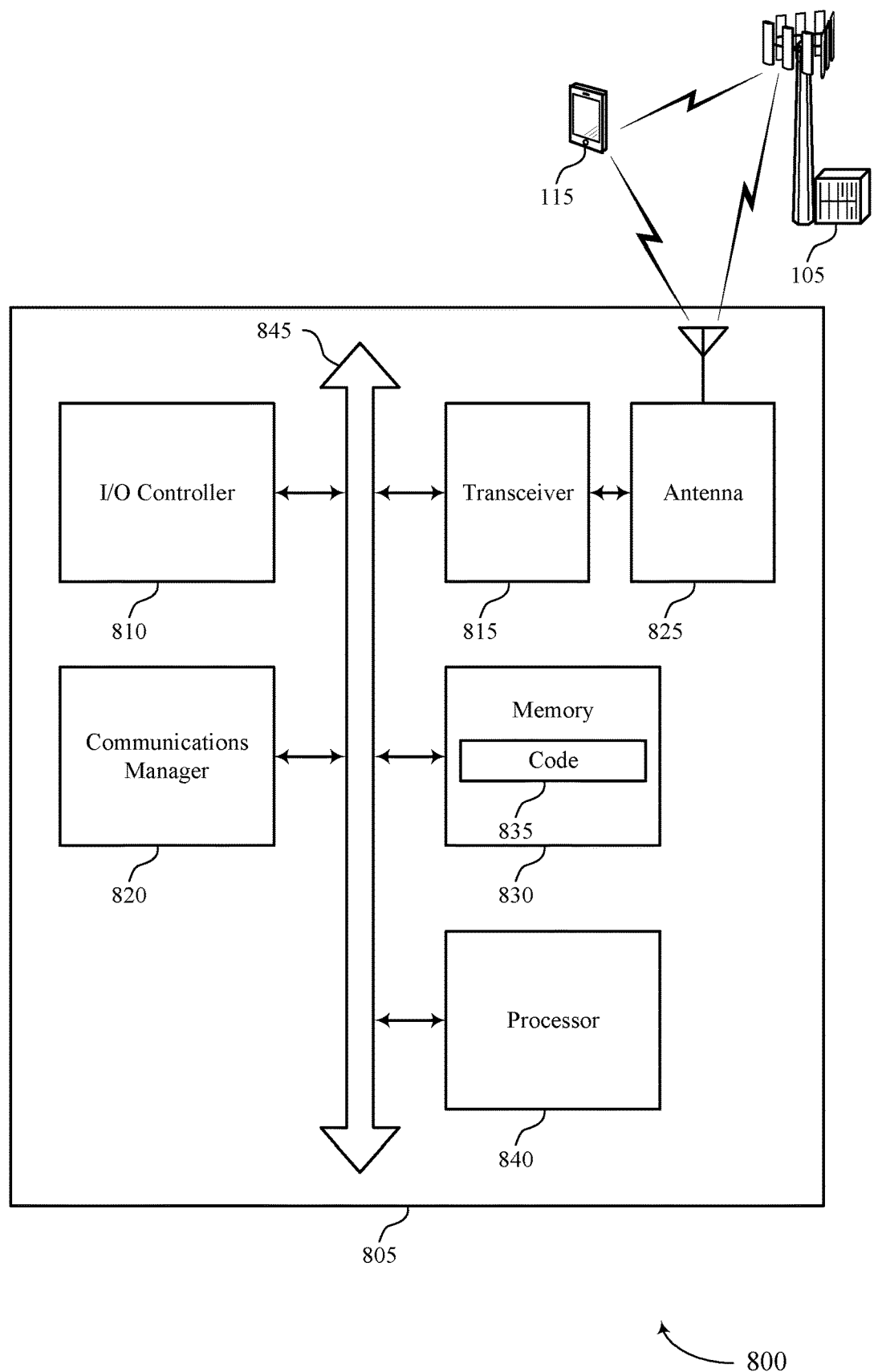
FIG. 8 shows a diagram of a system including a device that supports techniques for delay reduction and power optimization using a set of antenna modules in accordance with aspects of the present disclosure.

FIG. 8 shows a diagram of a system 800 including a device 805 that supports techniques for delay reduction and power optimization using a set of antenna modules in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for delay reduction and power optimization using a set of antenna modules). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for establishing a wireless connection with a primary cell. The communications manager 820 may be configured as or otherwise support a means for identifying a set of antenna modules of the UE and a set of multiple sets of receive beams, where each set of receive beams of the set of multiple sets of receive beams includes at least one beam from each antenna module of the set of antenna modules. The communications manager 820 may be configured as or otherwise support a means for performing a measurement procedure on signals received from one or more candidate secondary cells using at least a first set of receive beams of the set of multiple sets of receive beams. The communications manager 820 may be configured as or otherwise support a means for transmitting, to the primary cell, a measurement report based on performing the measurement procedure upon determining that at least one of the set of multiple sets of receive beams satisfies a threshold value and before performing the measurement procedure on signals received from the one or more candidate secondary cells using at least one remaining set of receive beams of the set of multiple sets of receive beams.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for delay reduction and power optimization using a set of antenna modules as described herein, or the processor 840 and the memory 830 may be otherwise configured to perform or support such operations.

Figure 9:
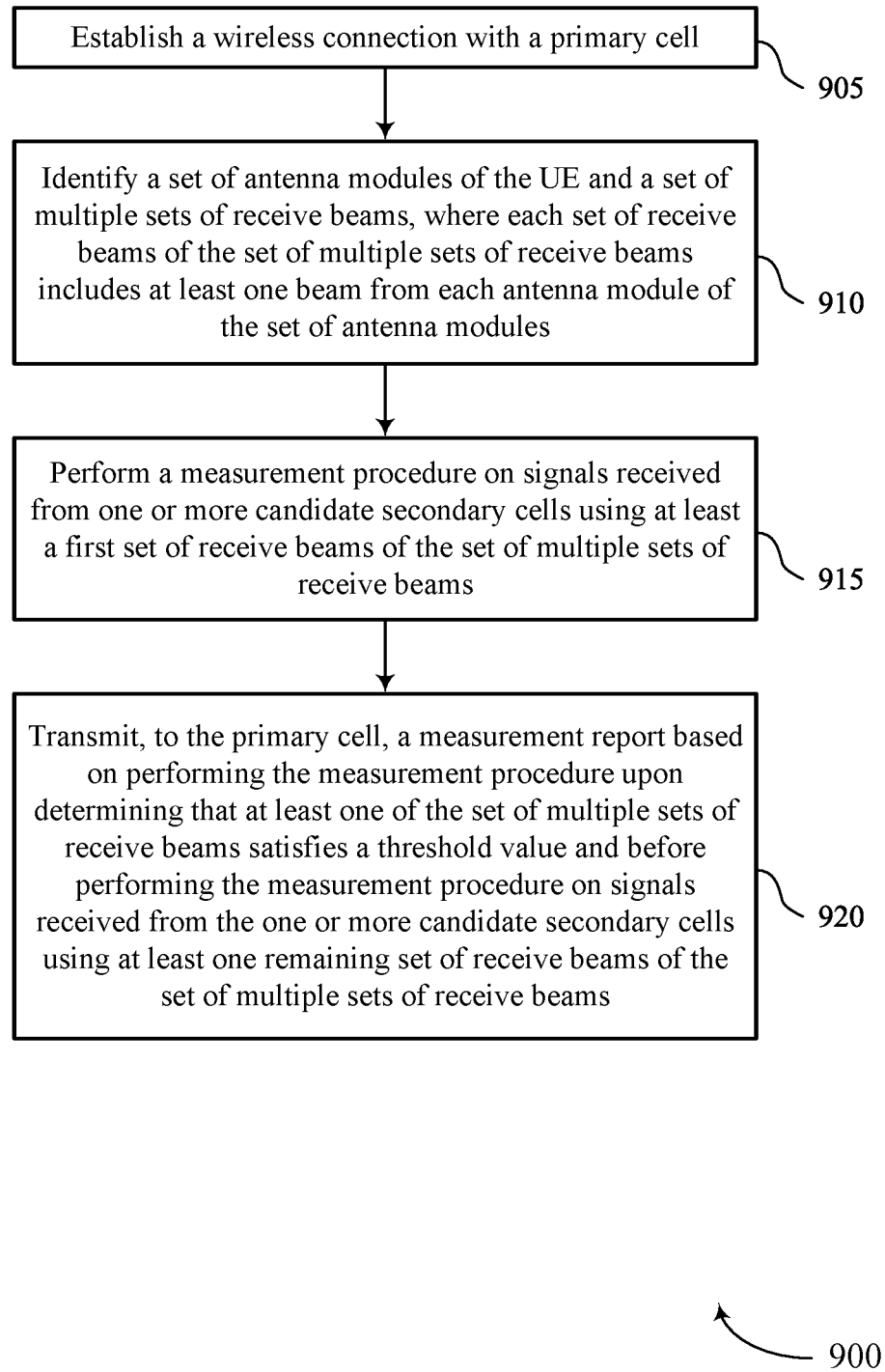
FIGS. 9 through 12 show flowcharts illustrating methods that support techniques for delay reduction and power optimization using a set of antenna modules in accordance with aspects of the present disclosure.

FIG. 9 shows a flowchart illustrating a method 900 that supports techniques for delay reduction and power optimization using a set of antenna modules in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions.

Additionally or alternatively, the UE may perform aspects of the described functions using special-purpose hardware.

At 905, the method may include establishing a wireless connection with a primary cell. The operations of 905 may be performed in accordance with examples as disclosed herein. In some examples, aspects of the operations of 905 may be performed by a connection establishment component 725 as described with reference to FIG. 7.

At 910, the method may include identifying a set of antenna modules of the UE and a set of multiple sets of receive beams, where each set of receive beams of the set of multiple sets of receive beams includes at least one beam from each antenna module of the set of antenna modules. The operations of 910 may be performed in accordance with examples as disclosed herein. In some examples, aspects of the operations of 910 may be performed by an antenna identification component 730 as described with reference to FIG. 7.

At 915, the method may include performing a measurement procedure on signals received from one or more candidate secondary cells using at least a first set of receive beams of the set of multiple sets of receive beams. The operations of 915 may be performed in accordance with examples as disclosed herein. In some examples, aspects of the operations of 915 may be performed by a measurement procedure component 735 as described with reference to FIG. 7.

At 920, the method may include transmitting, to the primary cell, a measurement report based on performing the measurement procedure upon determining that at least one of the set of multiple sets of receive beams satisfies a threshold value and before performing the measurement procedure on signals received from the one or more candidate secondary cells using at least one remaining set of receive beams of the set of multiple sets of receive beams. The operations of 920 may be performed in accordance with examples as disclosed herein. In some examples, aspects of the operations of 920 may be performed by a measurement report transmission component 740 as described with reference to FIG. 7.

Figure 10:
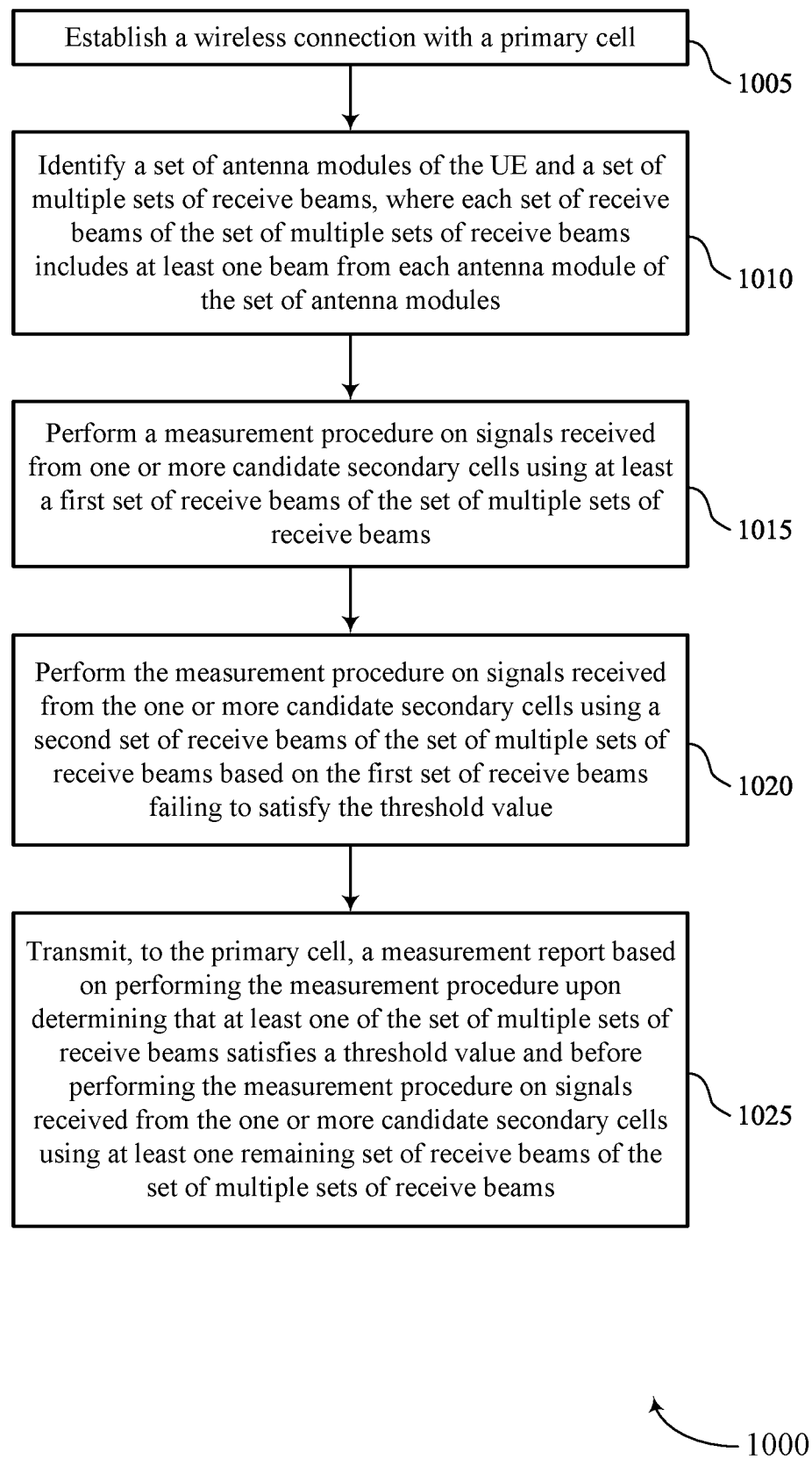

FIG. 10 shows a flowchart illustrating a method 1000 that supports techniques for delay reduction and power optimization using a set of antenna modules in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include establishing a wireless connection with a primary cell. The operations of 1005 may be performed in accordance with examples as disclosed herein. In some examples, aspects of the operations of 1005 may be performed by a connection establishment component 725 as described with reference to FIG. 7.

At 1010, the method may include identifying a set of antenna modules of the UE and a set of multiple sets of receive beams, where each set of receive beams of the set of multiple sets of receive beams includes at least one beam from each antenna module of the set of antenna modules. The operations of 1010 may be performed in accordance with examples as disclosed herein. In some examples, aspects of the operations of 1010 may be performed by an antenna identification component 730 as described with reference to FIG. 7.

At 1015, the method may include performing a measurement procedure on signals received from one or more candidate secondary cells using at least a first set of receive beams of the set of multiple sets of receive beams. The operations of 1015 may be performed in accordance with examples as disclosed herein. In some examples, aspects of the operations of 1015 may be performed by a measurement procedure component 735 as described with reference to FIG. 7.

At 1020, the method may include performing the measurement procedure on signals received from the one or more candidate secondary cells using a second set of receive beams of the set of multiple sets of receive beams based on the first set of receive beams failing to satisfy the threshold value. The operations of 1020 may be performed in accordance with examples as disclosed herein. In some examples, aspects of the operations of 1020 may be performed by a measurement procedure component 735 as described with reference to FIG. 7.

At 1025, the method may include transmitting, to the primary cell, a measurement report based on performing the measurement procedure upon determining that at least one of the set of multiple sets of receive beams satisfies a threshold value and before performing the measurement procedure on signals received from the one or more candidate secondary cells using at least one remaining set of receive beams of the set of multiple sets of receive beams. In some examples, transmitting the measurement report may include transmitting the measurement report based on performing the measurement procedure on the signals received using the second set of receive beams. The operations of 1025 may be performed in accordance with examples as disclosed herein. In some examples, aspects of the operations of 1025 may be performed by a measurement report transmission component 740 as described with reference to FIG. 7.

Figure 11:
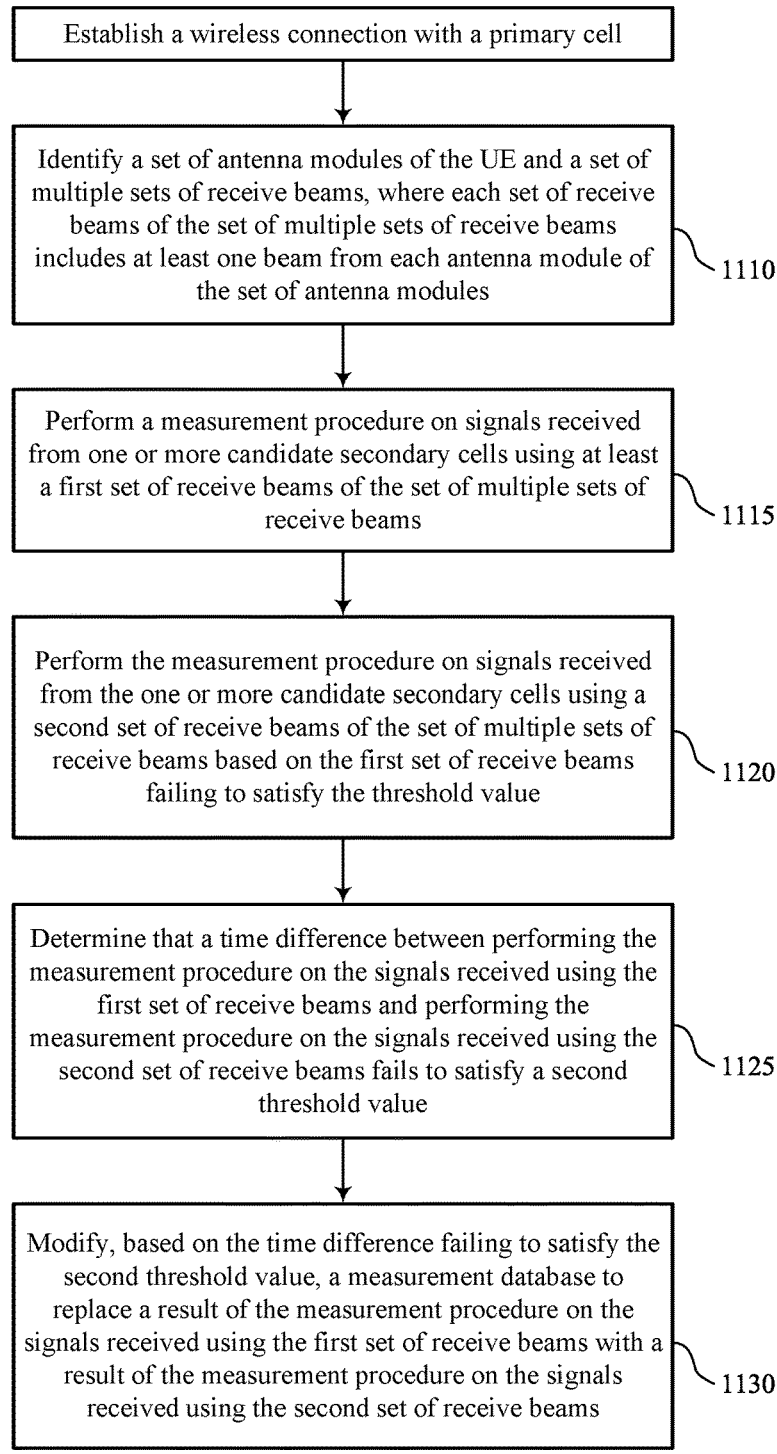

FIG. 11 shows a flowchart illustrating a method 1100 that supports techniques for delay reduction and power optimization using a set of antenna modules in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include establishing a wireless connection with a primary cell. The operations of 1105 may be performed in accordance with examples as disclosed herein. In some examples, aspects of the operations of 1105 may be performed by a connection establishment component 725 as described with reference to FIG. 7.

At 1110, the method may include identifying a set of antenna modules of the UE and a set of multiple sets of receive beams, where each set of receive beams of the set of multiple sets of receive beams includes at least one beam from each antenna module of the set of antenna modules. The operations of 1110 may be performed in accordance with examples as disclosed herein. In some examples, aspects of the operations of 1110 may be performed by an antenna identification component 730 as described with reference to FIG. 7.

At 1115, the method may include performing a measurement procedure on signals received from one or more candidate secondary cells using at least a first set of receive beams of the set of multiple sets of receive beams. The operations of 1115 may be performed in accordance with examples as disclosed herein. In some examples, aspects of the operations of 1115 may be performed by a measurement procedure component 735 as described with reference to FIG. 7.

At 1120, the method may include performing the measurement procedure on signals received from the one or more candidate secondary cells using a second set of receive beams of the set of multiple sets of receive beams based on the first set of receive beams failing to satisfy the threshold value. In some examples, transmitting the measurement report includes transmitting the measurement report based on performing the measurement procedure on the signals received using the second set of receive beams. The operations of 1120 may be performed in accordance with examples as disclosed herein. In some examples, aspects of the operations of 1120 may be performed by a measurement procedure component 735 as described with reference to FIG. 7.

At 1125, the method may include determining that a time difference between performing the measurement procedure on the signals received using the first set of receive beams and performing the measurement procedure on the signals received using the second set of receive beams fails to satisfy a second threshold value. The operations of 1125 may be performed in accordance with examples as disclosed herein. In some examples, aspects of the operations of 1125 may be performed by a time difference component 760 as described with reference to FIG. 7.

At 1130, the method may include modifying, based on the time difference failing to satisfy the second threshold value, a measurement database to replace a result of the measurement procedure on the signals received using the first set of receive beams with a result of the measurement procedure on the signals received using the second set of receive beams. The operations of 1130 may be performed in accordance with examples as disclosed herein. In some examples, aspects of the operations of 1130 may be performed by a database modification component 765 as described with reference to FIG. 7.

Figure 12:
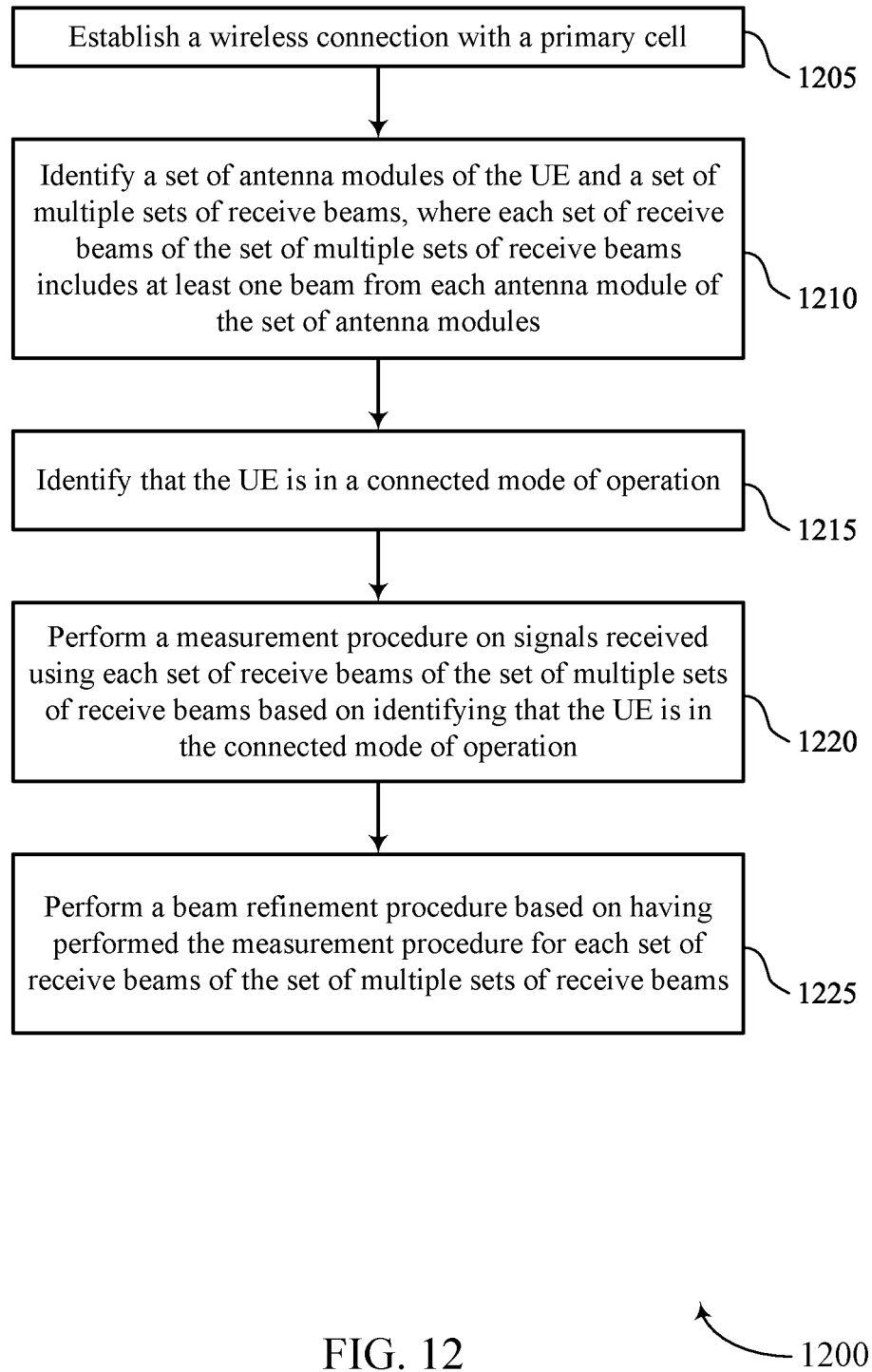

FIG. 12 shows a flowchart illustrating a method 1200 that supports techniques for delay reduction and power optimization using a set of antenna modules in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include establishing a wireless connection with a primary cell. The operations of 1205 may be performed in accordance with examples as disclosed herein. In some examples, aspects of the operations of 1205 may be performed by a connection establishment component 725 as described with reference to FIG. 7.

At 1210, the method may include identifying a set of antenna modules of the UE and a set of multiple sets of receive beams, where each set of receive beams of the set of multiple sets of receive beams includes at least one beam from each antenna module of the set of antenna modules. The operations of 1210 may be performed in accordance with examples as disclosed herein. In some examples, aspects of the operations of 1210 may be performed by an antenna identification component 730 as described with reference to FIG. 7.

At 1215, the method may include identifying that the UE is in a connected mode of operation. The operations of 1215 may be performed in accordance with examples as disclosed herein. In some examples, aspects of the operations of 1215 may be performed by a mode determination component 745 as described with reference to FIG. 7.

At 1220, the method may include performing a measurement procedure on signals received using each set of receive beams of the set of multiple sets of receive beams based on identifying that the UE is in the connected mode of operation. The operations of 1220 may be performed in accordance with examples as disclosed herein. In some examples, aspects of the operations of 1220 may be performed by a measurement procedure component 735 as described with reference to FIG. 7.

At 1225, the method may include performing a beam refinement procedure based on having performed the measurement procedure for each set of receive beams of the set of multiple sets of receive beams. The operations of 1225 may be performed in accordance with examples as disclosed herein. In some examples, aspects of the operations of 1225 may be performed by a beam refinement component 750 as described with reference to FIG. 7.

The following provides an overview of aspects of the present disclosure:

Aspect 1: A method for wireless communication at a UE, comprising: establishing a wireless connection with a primary cell; identifying a set of antenna modules of the UE and a plurality of sets of receive beams, wherein each set of receive beams of the plurality of sets of receive beams includes at least one beam from each antenna module of the set of antenna modules; performing a measurement procedure on signals received from one or more candidate secondary cells using at least a first set of receive beams of the plurality of sets of receive beams; and transmitting, to the primary cell, a measurement report based at least in part on performing the measurement procedure upon determining that at least one of the plurality of sets of receive beams satisfies a threshold value and before performing the measurement procedure on signals received from the one or more candidate secondary cells using at least one remaining set of receive beams of the plurality of sets of receive beams.

Aspect 2: The method of aspect 1, further comprising: performing the measurement procedure on signals received from the one or more candidate secondary cells using a second set of receive beams of the plurality of sets of receive beams based at least in part on the first set of receive beams failing to satisfy the threshold value, wherein transmitting the measurement report comprises transmitting the measurement report based at least in part on performing the measurement procedure on the signals received using the second set of receive beams.

Aspect 3: The method of aspect 2, further comprising: determining that a time difference between performing the measurement procedure on the signals received using the first set of receive beams and performing the measurement procedure on the signals received using the second set of receive beams satisfies a second threshold value; and modifying, based at least in part on the time difference satisfying the second threshold value, a measurement database to include a result of the measurement procedure on the signals received using the first set of receive beams and a result of the measurement procedure on the signals received using the second set of receive beams.

Aspect 4: The method of any of aspects 2 through 3, further comprising: determining that a time difference between performing the measurement procedure on the signals received using the first set of receive beams and performing the measurement procedure on the signals received using the second set of receive beams fails to satisfy a second threshold value; and modifying, based at least in part on the time difference failing to satisfy the second threshold value, a measurement database to replace a result of the measurement procedure on the signals received using the first set of receive beams with a result of the measurement procedure on the signals received using the second set of receive beams.

Aspect 5: The method of any of aspects 1 through 4, further comprising: identifying that the UE is in a connected mode of operation; performing the measurement procedure on signals received using each set of receive beams of the plurality of sets of receive beams based at least in part on identifying that the UE is in the connected mode of operation; and performing a beam refinement procedure based at least in part on having performed the measurement procedure for each set of receive beams of the plurality of sets of receive beams.

Aspect 6: The method of any of aspects 1 through 5, further comprising: determining that a measurement value of one or more parameters satisfies one or more second threshold values based at least in part on performing the measurement procedure on the signals received using the first set of receive beams; and refraining from performing the measurement procedure on the at least one remaining set of receive beams based at least in part the measurement value satisfying the one or more second threshold values, wherein the measurement report is based at least in part on performing the measurement procedure on the signals received using the first set of receive beams.

Aspect 7: The method of aspect 6, wherein determining that the measurement value of one or more parameters satisfies the one or more second threshold values comprises: determining that the measurement value of a signal to noise ratio, a reference signal receive quality, a reference signal receive power, or any combination thereof, is greater than the one or more second threshold values.

Aspect 8: The method of any of aspects 6 through 7, wherein determining that the measurement value of one or more parameters satisfies the one or more second threshold values comprises: determining that the measurement value of a signal to noise ratio, a reference signal receive quality, a reference signal receive power, or any combination thereof, is less than the one or more second threshold values.

Aspect 9: The method of any of aspects 1 through 8, further comprising: receiving, from the primary cell based at least in part on transmitting the measurement report, an indication of a secondary cell of the one or more candidate secondary cells with which the UE is to establish a connection; and establishing a connection with the indicated secondary cell in response to the received indication.

Aspect 10: The method of aspect 9, wherein the primary cell comprises a cell associated with a first radio access technology of a non-standalone mode of operation, and the secondary cell comprises a cell associated with a second radio access technology of the non-standalone mode of operation.

Aspect 11: The method of aspect 10, wherein the cell associated with the second radio access technology of the non-standalone mode of operation comprises a primary secondary cell.

Aspect 12: The method of any of aspects 9 through 11, wherein the primary cell comprises a cell associated with a first radio frequency spectrum band, and the secondary cell comprises a cell associated with a second radio frequency spectrum band.

Aspect 13: An apparatus for wireless communication at a UE, comprising a processor; memory coupled with the processor; and instructions stored in the memory and executable by the processor to cause the apparatus to perform a method of any of aspects 1 through 12.

Aspect 14: An apparatus for wireless communication at a UE, comprising at least one means for performing a method of any of aspects 1 through 12.

Aspect 15: A non-transitory computer-readable medium storing code for wireless communication at a UE, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   establishing a wireless connection with a primary cell;
   identifying a plurality of antenna modules of the UE and a plurality of sets of receive beams, wherein each set of receive beams of the plurality of sets of receive beams includes at least one beam from each antenna module of the plurality of antenna modules;
   performing a measurement procedure on signals received from one or more candidate secondary cells using at least a first set of receive beams of the plurality of sets of receive beams; and
   transmitting, to the primary cell, a measurement report based at least in part on performing the measurement procedure upon determining that at least one of the plurality of sets of receive beams satisfies a signal strength threshold value and before or without performing the measurement procedure on signals received from the one or more candidate secondary cells using at least one remaining set of receive beams of the plurality of sets of receive beams.

2. The method of claim 1, further comprising:
   performing the measurement procedure on signals received from the one or more candidate secondary cells using a second set of receive beams of the plurality of sets of receive beams based at least in part on the first set of receive beams failing to satisfy the signal strength threshold value, wherein transmitting the measurement report comprises transmitting the measurement report based at least in part on performing the measurement procedure on the signals received using the second set of receive beams.

3. The method of claim 2, further comprising:
   determining that a time difference between performing the measurement procedure on the signals received using the first set of receive beams and performing the measurement procedure on the signals received using the second set of receive beams satisfies a second threshold value; and
   modifying, based at least in part on the time difference satisfying the second threshold value, a measurement database to include a result of the measurement procedure on the signals received using the first set of receive beams and a result of the measurement procedure on the signals received using the second set of receive beams.

4. The method of claim 2, further comprising:
determining that a time difference between performing the measurement procedure on the signals received using the first set of receive beams and performing the measurement procedure on the signals received using the second set of receive beams fails to satisfy a second threshold value; and
modifying, based at least in part on the time difference failing to satisfy the second threshold value, a measurement database to replace a result of the measurement procedure on the signals received using the first set of receive beams with a result of the measurement procedure on the signals received using the second set of receive beams.

5. The method of claim 1, further comprising:
identifying that the UE is in a connected mode of operation;
performing the measurement procedure on signals received using each set of receive beams of the plurality of sets of receive beams based at least in part on identifying that the UE is in the connected mode of operation; and
performing a beam refinement procedure based at least in part on having performed the measurement procedure for each set of receive beams of the plurality of sets of receive beams.

6. The method of claim 1, further comprising:
determining that a measurement value of one or more parameters satisfies one or more second threshold values based at least in part on performing the measurement procedure on the signals received using the first set of receive beams; and
refraining from performing the measurement procedure on the at least one remaining set of receive beams based at least in part on the measurement value satisfying the one or more second threshold values, wherein the measurement report is based at least in part on performing the measurement procedure on the signals received using the first set of receive beams.

7. The method of claim 6, wherein determining that the measurement value of the one or more parameters satisfies the one or more second threshold values comprises:
determining that the measurement value of a signal to noise ratio, a reference signal receive quality, a reference signal receive power, or any combination thereof, is greater than the one or more second threshold values.

8. The method of claim 6, wherein determining that the measurement value of the one or more parameters satisfies the one or more second threshold values comprises:
determining that the measurement value of a signal to noise ratio, a reference signal receive quality, a reference signal receive power, or any combination thereof, is less than the one or more second threshold values.

9. The method of claim 1, further comprising:
receiving, from the primary cell based at least in part on transmitting the measurement report, an indication of a secondary cell of the one or more candidate secondary cells with which the UE is to establish a connection; and
establishing the connection with the indicated secondary cell in response to the received indication.

10. The method of claim 9, wherein the primary cell comprises a cell associated with a first radio access technology of a non-standalone mode of operation, and the secondary cell comprises a cell associated with a second radio access technology of the non-standalone mode of operation.

11. The method of claim 10, wherein the cell associated with the second radio access technology of the non-standalone mode of operation comprises a primary secondary cell.

12. The method of claim 9, wherein the primary cell comprises a cell associated with a first radio frequency spectrum band, and the secondary cell comprises a cell associated with a second radio frequency spectrum band.

13. An apparatus for wireless communication at a user equipment (UE), comprising:
a processor;
memory coupled with the processor; and
instructions stored in the memory and executable by the processor to cause the apparatus to:
establish a wireless connection with a primary cell;
identify a plurality of antenna modules of the UE and a plurality of sets of receive beams, wherein each set of receive beams of the plurality of sets of receive beams includes at least one beam from each antenna module of the plurality of antenna modules;
perform a measurement procedure on signals received from one or more candidate secondary cells using at least a first set of receive beams of the plurality of sets of receive beams; and
transmit, to the primary cell, a measurement report based at least in part on performing the measurement procedure upon determining that at least one of the plurality of sets of receive beams satisfies a signal strength threshold value and before or without performing the measurement procedure on signals received from the one or more candidate secondary cells using at least one remaining set of receive beams of the plurality of sets of receive beams.

14. The apparatus of claim 13, wherein the instructions are further executable by the processor to cause the apparatus to:
perform the measurement procedure on signals received from the one or more candidate secondary cells using a second set of receive beams of the plurality of sets of receive beams based at least in part on the first set of receive beams failing to satisfy the signal strength threshold value, wherein transmitting the measurement report comprises transmitting the measurement report based at least in part on performing the measurement procedure on the signals received using the second set of receive beams.

15. The apparatus of claim 14, wherein the instructions are further executable by the processor to cause the apparatus to:
determine that a time difference between performing the measurement procedure on the signals received using the first set of receive beams and performing the measurement procedure on the signals received using the second set of receive beams satisfies a second threshold value; and
modify, based at least in part on the time difference satisfying the second threshold value, a measurement database to include a result of the measurement procedure on the signals received using the first set of receive beams and a result of the measurement procedure on the signals received using the second set of receive beams.

16. The apparatus of claim 14, wherein the instructions are further executable by the processor to cause the apparatus to:
  determine that a time difference between performing the measurement procedure on the signals received using the first set of receive beams and performing the measurement procedure on the signals received using the second set of receive beams fails to satisfy a second threshold value; and
  modify, based at least in part on the time difference failing to satisfy the second threshold value, a measurement database to replace a result of the measurement procedure on the signals received using the first set of receive beams with a result of the measurement procedure on the signals received using the second set of receive beams.

17. The apparatus of claim 13, wherein the instructions are further executable by the processor to cause the apparatus to:
  identify that the UE is in a connected mode of operation;
  perform the measurement procedure on signals received using each set of receive beams of the plurality of sets of receive beams based at least in part on identifying that the UE is in the connected mode of operation; and
  perform a beam refinement procedure based at least in part on having performed the measurement procedure for each set of receive beams of the plurality of sets of receive beams.

18. The apparatus of claim 13, wherein the instructions are further executable by the processor to cause the apparatus to:
  determine that a measurement value of one or more parameters satisfies one or more second threshold values based at least in part on performing the measurement procedure on the signals received using the first set of receive beams; and
  refrain from performing the measurement procedure on the at least one remaining set of receive beams based at least in part on the measurement value satisfying the one or more second threshold values, wherein the measurement report is based at least in part on performing the measurement procedure on the signals received using the first set of receive beams.

19. The apparatus of claim 18, wherein the instructions are further executable by the processor to determine that the measurement value of the one or more parameters satisfies the one or more second threshold values by being executable by the processor to:
  determine that the measurement value of a signal to noise ratio, a reference signal receive quality, a reference signal receive power, or any combination thereof, is greater than the one or more second threshold values.

20. The apparatus of claim 18, wherein the instructions are further executable by the processor to determine that the measurement value of the one or more parameters satisfies the one or more second threshold values by being executable by the processor to:
  determine that the measurement value of a signal to noise ratio, a reference signal receive quality, a reference signal receive power, or any combination thereof, is less than the one or more second threshold values.

21. The apparatus of claim 13, wherein the instructions are further executable by the processor to cause the apparatus to:
  receive, from the primary cell based at least in part on transmitting the measurement report, an indication of a secondary cell of the one or more candidate secondary cells with which the UE is to establish a connection; and
  establish the connection with the indicated secondary cell in response to the received indication.

22. The apparatus of claim 21, wherein the primary cell comprises a cell associated with a first radio access technology of a non-standalone mode of operation, and the secondary cell comprises a cell associated with a second radio access technology of the non-standalone mode of operation.

23. The apparatus of claim 22, wherein the cell associated with the second radio access technology of the non-standalone mode of operation comprises a primary secondary cell.

24. The apparatus of claim 21, wherein the primary cell comprises a cell associated with a first radio frequency spectrum band, and the secondary cell comprises a cell associated with a second radio frequency spectrum band.

25. An apparatus for wireless communication at a user equipment (UE), comprising:
  means for establishing a wireless connection with a primary cell;
  means for identifying a plurality of antenna modules of the UE and a plurality of sets of receive beams, wherein each set of receive beams of the plurality of sets of receive beams includes at least one beam from each antenna module of the plurality of antenna modules;
  means for performing a measurement procedure on signals received from one or more candidate secondary cells using at least a first set of receive beams of the plurality of sets of receive beams; and
  means for transmitting, to the primary cell, a measurement report based at least in part on performing the measurement procedure upon determining that at least one of the plurality of sets of receive beams satisfies a signal strength threshold value and before or without performing the measurement procedure on signals received from the one or more candidate secondary cells using at least one remaining set of receive beams of the plurality of sets of receive beams.

26. The apparatus of claim 25, further comprising:
  means for performing the measurement procedure on signals received from the one or more candidate secondary cells using a second set of receive beams of the plurality of sets of receive beams based at least in part on the first set of receive beams failing to satisfy the signal strength threshold value, wherein transmitting the measurement report comprises transmitting the measurement report based at least in part on performing the measurement procedure on the signals received using the second set of receive beams.

27. The apparatus of claim 26, further comprising:
  means for determining that a time difference between performing the measurement procedure on the signals received using the first set of receive beams and performing the measurement procedure on the signals received using the second set of receive beams satisfies a second threshold value; and
  means for modifying, based at least in part on the time difference satisfying the second threshold value, a measurement database to include a result of the measurement procedure on the signals received using the first set of receive beams and a result of the measurement procedure on the signals received using the second set of receive beams.

28. The apparatus of claim 26, further comprising:
means for determining that a time difference between performing the measurement procedure on the signals received using the first set of receive beams and performing the measurement procedure on the signals received using the second set of receive beams fails to satisfy a second threshold value; and
means for modifying, based at least in part on the time difference failing to satisfy the second threshold value, a measurement database to replace a result of the measurement procedure on the signals received using the first set of receive beams with a result of the measurement procedure on the signals received using the second set of receive beams.

29. The apparatus of claim 25, further comprising:
means for identifying that the UE is in a connected mode of operation;
means for performing the measurement procedure on signals received using each set of receive beams of the plurality of sets of receive beams based at least in part on identifying that the UE is in the connected mode of operation; and
means for performing a beam refinement procedure based at least in part on having performed the measurement procedure for each set of receive beams of the plurality of sets of receive beams.

30. A non-transitory computer-readable medium storing code for wireless communication at a user equipment (UE), the code comprising instructions executable by a processor to:
establish a wireless connection with a primary cell;
identify a plurality of antenna modules of the UE and a plurality of sets of receive beams, wherein each set of receive beams of the plurality of sets of receive beams includes at least one beam from each antenna module of the plurality of antenna modules;
perform a measurement procedure on signals received from one or more candidate secondary cells using at least a first set of receive beams of the plurality of sets of receive beams; and
transmit, to the primary cell, a measurement report based at least in part on performing the measurement procedure upon determining that at least one of the plurality of sets of receive beams satisfies a signal strength threshold value and before or without performing the measurement procedure on signals received from the one or more candidate secondary cells using at least one remaining set of receive beams of the plurality of sets of receive beams.

* * * * *